(12) United States Patent
Nelson-Herron et al.

(10) Patent No.: US 10,182,952 B1
(45) Date of Patent: Jan. 22, 2019

(54) WHEELCHAIR SYSTEMS AND RELATED METHODS

(71) Applicants: Blanche Michelle Nelson-Herron, Downey, CA (US); Gary B. Justice, Long Beach, CA (US)

(72) Inventors: Blanche Michelle Nelson-Herron, Downey, CA (US); Gary B. Justice, Long Beach, CA (US)

(73) Assignee: Blanche Michelle Nelson-Herron, Downey, CA (US)

( * ) Notice: Subject to any disclaimer, the term of this patent is extended or adjusted under 35 U.S.C. 154(b) by 0 days.

(21) Appl. No.: 15/929,032

(22) Filed: Jul. 13, 2018

Related U.S. Application Data

(60) Provisional application No. 62/536,080, filed on Jul. 24, 2017.

(51) Int. Cl.
*B60Q 1/00* (2006.01)
*G08G 1/16* (2006.01)
(Continued)

(52) U.S. Cl.
CPC .............. *A61G 5/10* (2013.01); *B60Q 3/70* (2017.02); *B60Q 5/005* (2013.01); *B60Q 9/00* (2013.01);
(Continued)

(58) Field of Classification Search
CPC ...... G08G 1/163; G08G 1/166; G08G 1/0962; G08G 1/052; B60Q 9/008; B60Q 1/142; B60Q 1/0023; G01S 5/0072; B60K 28/10
See application file for complete search history.

(56) References Cited

U.S. PATENT DOCUMENTS

| 6,702,314 B1* | 3/2004 | Crose | A61G 5/10 |
| | | | 280/304.1 |
| 6,753,765 B2* | 6/2004 | Masuda | B60K 28/10 |
| | | | 180/167 |

(Continued)

OTHER PUBLICATIONS

Jacob Kastrenakes, Intel announces 5G modem for phone, auto, and drone testing, The Verge, published online by theverge.com at least as early as Jan. 4, 2017, available online at https://www.theverge.com/2017/1/4/14165888/intel-5g-modem-announced, last visited Jun. 25, 2018.

*Primary Examiner* — Hoi C Lau
(74) *Attorney, Agent, or Firm* — Law Office of Paul B. Johnson; Paul Johnson

(57) ABSTRACT

A wheelchair system includes a chip assembly configured to be coupled with a wheelchair, the chip assembly including a wireless communication chip. The wireless communication chip is programmed to, in response to the chip assembly coming within a predetermined range of a dedicated short range communication (DSRC) device of an automobile, automatically communicate, through a telecommunications network, a notification signal to the DSRC device that the wheelchair is within the predetermined range. The chip assembly includes one or more chips configured to, in response to receiving an acknowledgment signal through the telecommunications network from the DSRC device, provide an acknowledgment notification to a user of the wheelchair that the notification signal was received. In implementations a geospatial algorithm is stored within memory of the chip assembly, the assembly programmed to determine, using the algorithm, when the wheelchair has experienced an accident event, and to automatically notify one or more persons.

9 Claims, 17 Drawing Sheets

(51) Int. Cl.
*G08G 1/00* (2006.01)
*A61G 5/10* (2006.01)
*H04W 4/80* (2018.01)
*B60Q 9/00* (2006.01)
*B60Q 3/70* (2017.01)
*G09F 21/04* (2006.01)
*G09F 17/00* (2006.01)
*B60Q 5/00* (2006.01)
*G09F 13/18* (2006.01)

(52) U.S. Cl.
CPC ............ *B60Q 9/008* (2013.01); *G09F 17/00* (2013.01); *G09F 21/04* (2013.01); *H04W 4/80* (2018.02); *G09F 13/18* (2013.01)

(56) References Cited

U.S. PATENT DOCUMENTS

| | | | | |
|---|---|---|---|---|
| 8,253,589 B2* | 8/2012 | Grimm | ................. | G01S 5/0072 340/539.1 |
| 9,215,659 B2* | 12/2015 | Asrani | ................. | H04W 4/023 |
| 9,281,965 B2* | 3/2016 | Wakabayashi | ........... | G08G 1/20 |
| 9,421,909 B2* | 8/2016 | Strickland | ................. | B60Q 9/008 |
| 9,505,412 B2* | 11/2016 | Bai | ........................ | G08B 21/06 |
| 9,536,427 B2 | 1/2017 | Tonguz et al. | | |
| 9,675,507 B1* | 6/2017 | Wilson-Hunter | ........ | A61G 5/10 |
| 9,692,510 B2 | 6/2017 | Ryan et al. | | |
| 9,881,503 B1* | 1/2018 | Goldman-Shenhar | ...................... | G08G 1/166 |
| 2003/0156020 A1* | 8/2003 | Masuda | ................. | B60K 28/10 340/435 |
| 2004/0092230 A1* | 5/2004 | Miyazaki | ............. | H01Q 1/3208 455/41.2 |
| 2005/0209769 A1* | 9/2005 | Yamashita | ............. | G08G 1/017 701/117 |
| 2007/0132609 A1* | 6/2007 | Stackelhouse | ....... | G08G 1/0965 340/904 |
| 2007/0159354 A1* | 7/2007 | Rosenberg | ........... | G08G 1/0965 340/902 |
| 2009/0322558 A1* | 12/2009 | Videtich | ................. | H04W 4/21 340/870.07 |
| 2010/0141438 A1* | 6/2010 | Black | ...................... | A61G 5/10 340/540 |
| 2010/0214085 A1* | 8/2010 | Avery | ...................... | G08G 1/161 340/435 |
| 2011/0018736 A1* | 1/2011 | Carr | ...................... | G08G 1/0965 340/902 |
| 2011/0090093 A1* | 4/2011 | Grimm | ................. | G01S 5/0072 340/901 |
| 2012/0268264 A1* | 10/2012 | Son | .................... | G08B 13/1427 340/457 |
| 2012/0306634 A1* | 12/2012 | Tsuda | ................... | B60Q 1/2611 340/425.5 |
| 2013/0137372 A1* | 5/2013 | Nishidai | ................. | H04B 5/00 455/41.1 |
| 2013/0218380 A1* | 8/2013 | Phillips | ............... | B60L 11/1805 701/22 |
| 2014/0062685 A1* | 3/2014 | Tamatsu | ................. | B60Q 5/005 340/425.5 |
| 2014/0142783 A1* | 5/2014 | Grimm | ................... | G06F 17/00 701/2 |
| 2014/0313761 A1* | 10/2014 | Nelson-Herron | ....... | G09F 17/00 362/523 |
| 2015/0035685 A1* | 2/2015 | Strickland | .............. | B60Q 9/008 340/901 |
| 2015/0091740 A1* | 4/2015 | Bai | ........................ | G08B 21/06 340/901 |
| 2015/0116103 A1* | 4/2015 | Yang | ...................... | G08B 21/24 340/438 |
| 2015/0149042 A1* | 5/2015 | Cooper | ................. | B60R 16/037 701/48 |
| 2015/0177362 A1* | 6/2015 | Gutierrez | ................. | B60R 25/245 701/519 |
| 2015/0197196 A1* | 7/2015 | Lin | ........................ | B60Q 9/008 340/436 |
| 2015/0228066 A1* | 8/2015 | Farb | .................... | G06K 9/00805 348/148 |
| 2015/0228195 A1* | 8/2015 | Beaurepaire | ......... | G08G 1/0962 340/907 |
| 2015/0251599 A1* | 9/2015 | Koravadi | ............... | B60Q 9/008 340/903 |
| 2015/0332532 A1* | 11/2015 | Lee | .................... | G07C 9/00563 340/5.72 |
| 2016/0205238 A1* | 7/2016 | Abramson | ......... | G01C 21/3484 455/456.4 |
| 2016/0260328 A1* | 9/2016 | Mishra | .................... | G08G 1/163 |
| 2016/0277196 A1* | 9/2016 | Jose | .................... | H04L 12/18 |
| 2016/0277197 A1* | 9/2016 | Jose | .................... | H04W 64/00 |
| 2016/0335895 A1* | 11/2016 | Lui | ...................... | B60R 25/24 |
| 2017/0021760 A1* | 1/2017 | Calnek | .................... | H04W 4/02 |
| 2017/0080952 A1* | 3/2017 | Gupta | .................... | B60K 35/00 |
| 2017/0279498 A1* | 9/2017 | Smith | ...................... | G08B 5/36 |
| 2018/0050635 A1* | 2/2018 | Vincent | .................. | B60Q 5/006 |
| 2018/0106906 A1* | 4/2018 | Mikami | .................... | G01S 19/07 |
| 2018/0120860 A1* | 5/2018 | Longin | ................. | A61G 5/0866 |
| 2018/0208140 A1* | 7/2018 | Sugimoto | ................. | G01S 19/07 |

* cited by examiner

WHEELCHAIR SYSTEMS AND RELATED METHODS

CROSS REFERENCE TO RELATED APPLICATIONS

This document claims the benefit of the filing date of U.S. Provisional Patent Application No. 62/536,080, entitled "Safe Sight," naming as first inventor Blanche Michelle Nelson-Herron, which was filed on Jul. 27, 2017, the disclosure of which is hereby incorporated entirely herein by reference.

BACKGROUND

1. Technical Field

Aspects of this document relate generally to wheelchairs and other non-ambulatory devices.

2. Background Art

Wheelchair users at times find that vehicle operators do not notice them when the wheelchair users are crossing proximate vehicles (such as in front of, behind, or on the side of a vehicle). In some cases this is at least partly because the wheelchair-pedestrian is below (or near the bottom of) the view of the motorist's line of sight. This can cause accidents and injury to a wheelchair-pedestrian and/or damage to a vehicle. Whether a driver is driving forward, turning, backing up, etc., there is a danger to wheelchair-pedestrian in the area. While wheelchair flags and other visible mechanisms exist for safety (such as reflective members), there exists a need to keep wheelchair users safer from collisions with moving vehicles.

SUMMARY

Embodiments of wheelchair systems may include: a chip assembly configured to be coupled with a wheelchair, the chip assembly including a wireless communication chip; wherein the wireless communication chip is programmed to, in response to the chip assembly coming within a predetermined range of a dedicated short range communication (DSRC) device of an automobile, automatically communicate, through a telecommunications network, a notification signal to the DSRC device that the wheelchair is within the predetermined range.

Embodiments of wheelchair systems may include one or more or all of the following:

The chip assembly may include one or more chips configured to, in response to receiving an acknowledgment signal through the telecommunications network from the DSRC device, provide an acknowledgment notification to a user of the wheelchair that the notification signal was received.

A light may be communicatively coupled with the chip assembly, and the acknowledgment notification may include illuminating the light.

A sound unit may be communicatively coupled with the chip assembly, and the acknowledgment notification may include a sound generated by the sound unit.

A tactile unit may be communicatively coupled with the chip assembly, and the acknowledgment notification may include a tactile notification generated by the tactile unit.

The chip assembly may further include a GPS chip and a SIM card.

A database may be communicatively coupled with the chip assembly through the telecommunications network.

The chip assembly may be attached to a pennant assembly configured to be coupled with the wheelchair.

The chip assembly may include a power source, an antenna, and a modem.

The chip assembly may include a memory having a geospatial algorithm stored therein and the chip assembly may be programmed to determine, using the geospatial algorithm, when the wheelchair has experienced an accident event.

The chip assembly may be programmed to, in response to determining that the wheelchair has experienced the accident event, automatically send an accident notification to a person whose contact information is stored within the database.

Embodiments of wheelchair systems may include: a wheelchair; a chip assembly coupled with the wheelchair, the chip assembly including a wireless communication chip, and; a database communicatively coupled with the chip assembly through a telecommunications network; wherein the wireless communication chip is programmed to, in response to the chip assembly coming within a predetermined range of a dedicated short range communication (DSRC) device of an automobile, automatically communicate, through the telecommunications network, a notification signal to the DSRC device that the wheelchair is within the predetermined range.

Embodiments of wheelchair systems may include one or more or all of the following:

The chip assembly may include one or more chips configured to, in response to receiving an acknowledgment signal through the telecommunications network from the DSRC device, provide an acknowledgment notification to a user of the wheelchair, wherein the acknowledgment notification includes one of a sound notification generated by a sound device coupled with the chip assembly, a tactile notification generated by a tactile unit coupled with the chip assembly, and a visual signal generated by a light coupled with the chip assembly.

The chip assembly may include a power source, an antenna, a modem, a GPS chip, and a SIM card.

The chip assembly may include a memory having a geospatial algorithm stored therein, and the chip assembly may be programmed to determine, using the geospatial algorithm, when the wheelchair has experienced an accident event and to, in response to determining that the wheelchair has experienced the accident event, automatically send an accident notification to one of police, emergency personnel, and a contact person stored in the database.

Embodiments of methods of use of a wheelchair system may include: providing a chip assembly configured to be coupled with a wheelchair, the chip assembly including a wireless communication chip; providing a database communicatively coupled with the chip assembly through a telecommunications network, and; in response to the chip assembly entering a predetermined range of a dedicated short range communication (DSRC) device of an automobile, automatically wirelessly communicating, through the telecommunications network, a notification signal from the wireless communication chip to the DSRC device that the wheelchair is within the predetermined range.

Embodiments of methods of use of a wheelchair system may include one or more or all of the following:

Providing one of a visual notification, a tactile notification, and a sound notification to a driver of the automobile in response to the DSRC device receiving the notification signal.

In response to the DSRC device receiving the notification signal, automatically wirelessly communicating an acknowledgment signal to the chip assembly from the DSRC device.

In response to the chip assembly receiving the acknowledgment signal, providing one of a sound notification, a tactile notification, and a visual notification to a user of the wheelchair.

The chip assembly may include a memory having a geospatial algorithm stored therein, and the method may include the chip assembly determining, using the geospatial algorithm, when the wheelchair has experienced an accident event and, in response to determining that the accident event has occurred, automatically sending an accident notification to a person whose contact information is stored within the database.

General details of the above-described embodiments, and other embodiments, are given below in the DESCRIPTION, the DRAWINGS, and the CLAIMS.

BRIEF DESCRIPTION OF THE DRAWINGS

Embodiments will be discussed hereafter using reference to the included drawings, briefly described below, wherein like designations refer to like elements.

DESCRIPTION

Implementations/embodiments disclosed herein (including those not expressly discussed in detail) are not limited to the particular components or procedures described herein. Additional or alternative components, assembly procedures, and/or methods of use consistent with the intended wheelchair systems and related methods may be utilized in any implementation. This may include any materials, components, sub-components, methods, sub-methods, steps, and so forth.

Wheelchair systems and methods disclosed herein allow a vehicle operator to detect the presence of a wheelchair-pedestrian both visually (such as through the use of a flag or pennant) and also by one or more electronic notifications sent to the driver of a vehicle (such as an audio and/or visual alert sent to the driver of a vehicle that a wheelchair-pedestrian is nearby).

Figure 1:
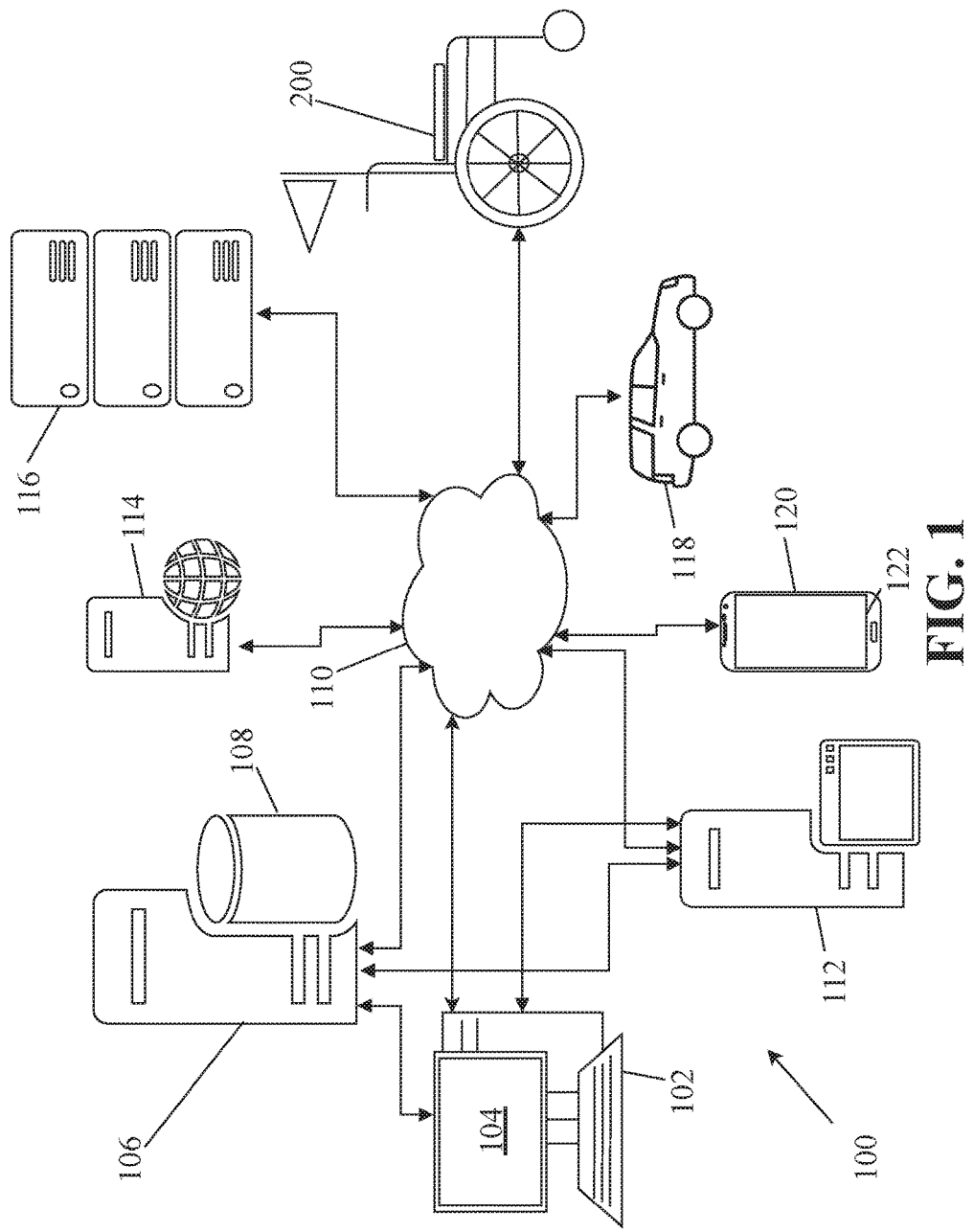
FIG. 1 is a diagram of an implementation of a wheelchair system (system)

Referring to FIG. 1, an implementation of a wheelchair system (system) 100 is diagrammed. System 100 includes a computing device 102 having a display 104 upon which one or more user interfaces may be displayed to allow a user (such as an admin) to set up various elements of the system, such as by non-limiting example storing one or more elements in a database 108 by communication with a database server 106 either by direct connection (wired) or through a telecommunications network 110 such as, by non-limiting example, the Internet. The telecommunications network may include a variety of elements, including cell towers, multiple-input and multiple-output (MIMO) towers, transceivers, wired and wireless components, and so forth.

An application server 112 is shown, and this may be used to interface between a user (such as a wheelchair user or a driver) and the system (such as the database) through an application of a computer, smart device, smart phone, tablet, smart speaker, smart glasses, or any other computing device. A web server 114 is shown, which in implementations may be included to allow an admin, or wheelchair user, or driver to interface with the system via a website. One or more third party servers 116 may be used (for example the database server and database, application server, web server, and/or any other computing servers or the like) may actually be implemented using third party servers through a cloud connection. A wheelchair 200 is shown coupled with the system, as is a vehicle 118, which elements will be described in more detail hereafter.

Wheelchair systems in implementations may include additional elements or may exclude some of the elements shown in FIG. 1.

Figure 2:
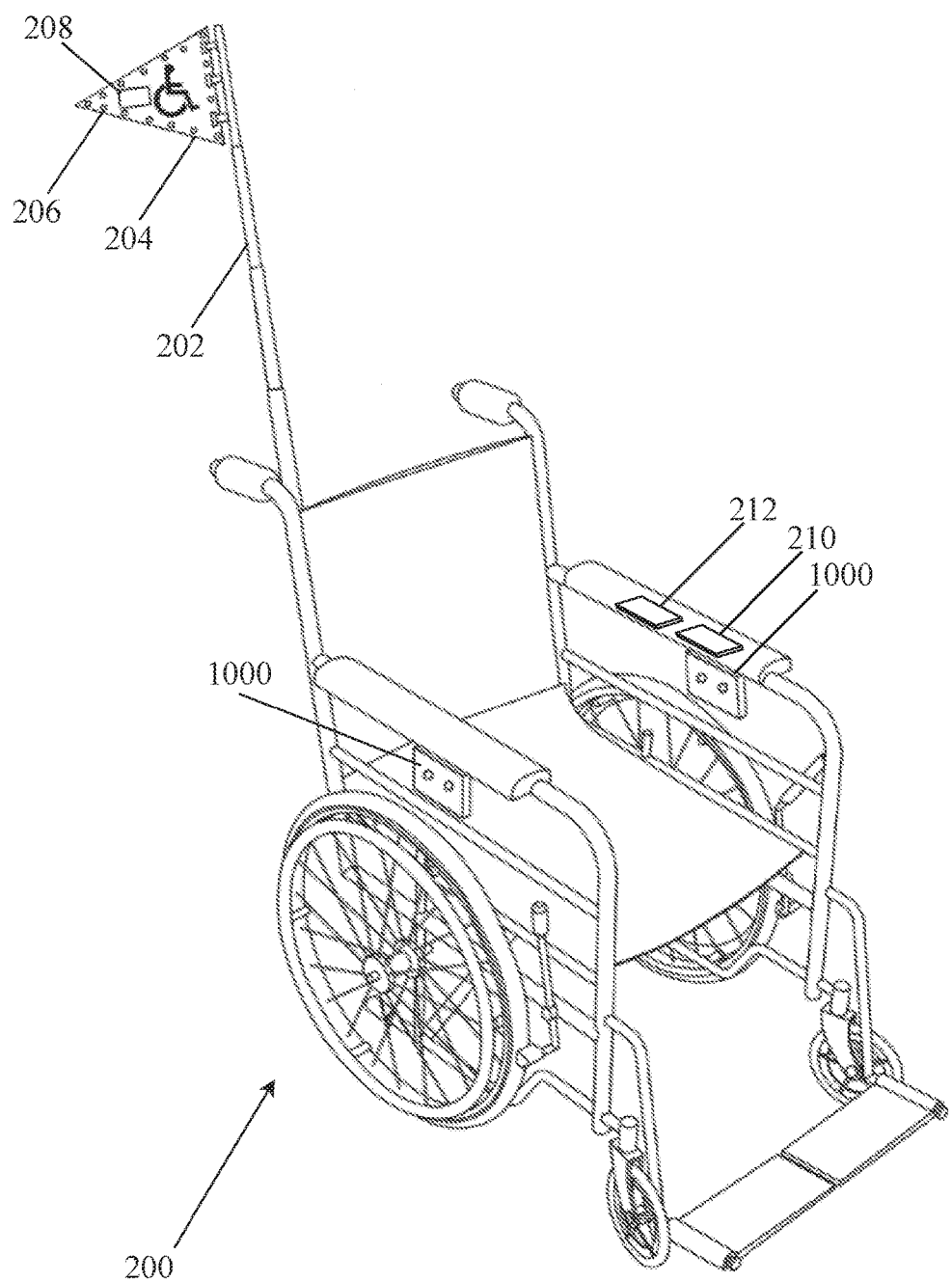
FIG. 2 is a front perspective view of an implementation of a wheelchair of the system of FIG. 1.

Referring now to FIG. 2, an implementation of a wheelchair 200 to be used in system 100 is shown. Wheelchair 200 has many elements which will be described, and may include any elements described in U.S. Patent Publication No. 2014/0313761 entitled "Wheel Chair Lighting," listing as first inventor Blanche M. Nelson-Herron, filed Apr. 17, 2013, the entire disclosure of which is incorporated herein by reference. The wheelchair 200 includes mechanisms for alerting vehicle drivers of a nearby person in a wheelchair or other non-ambulatory transporting equipment (though the disclosure here focuses on wheelchairs, the elements that make the wheelchair safer may be incorporated on any non-ambulatory device).

The wheelchair 200 is seen to include a telescoping pole 202 including a plurality of telescoping segments. In the example shown there are four telescoping segments and the topmost segment has a pennant assembly 204 coupled therewith. The pennant assembly includes one or more lights 206 to provide visual notification to nearby drivers that there is a wheelchair user nearby. In the implementation shown the one or more lights 206 is implemented as a string of light emitting diodes (LEDs) bordering the pennant assembly. A wheelchair logo is also seen on the pennant assembly, which may notify a driver seeing the pennant assembly (but who does not see the wheelchair or wheelchair user, such as a person in a tall vehicle) that the pennant assembly is coupled with a wheelchair. The lights are useful to help drivers (including those of DSRC-enabled vehicles and drivers of older-model vehicles not equipped with dedicated short-range communications (DSRC) technology) to see wheelchair-pedestrians nearby. The pennant assembly is seen here to have the shape of a triangle, but in other implementations it could have a different shape such as a rectangle, a square, a circle, any n-sided regular or irregular polygon, or any other regular or irregular shape.

For modern vehicles equipped with DSRC technology, the wheelchair may include a passive On Board Unit (OBU) chip set 208. In implementations the chip set is installed as part of the pennant assembly itself, in other words it is incorporated therein and is covered with a protective sealed enclosure—though in other implementations it could be located elsewhere on the wheelchair. In implementations the chip set is powered by a lithium or lithium ion battery as a power slave to the chip set which in implementations hosts an always-on uplink beacon. The chip set in implementations allows communication by the wheelchair 200 or other non-ambulatory transportation equipment through a local MIMO tower (a part of a local DSRC cellular network) to inform DSRC-equipped vehicles of the presence of a wheelchair-pedestrian. In implementations the chip set and the DSRC-equipped vehicle only communicate with one another in a low-latency way, and within a 5G cellular network infrastructure.

Figure 3:
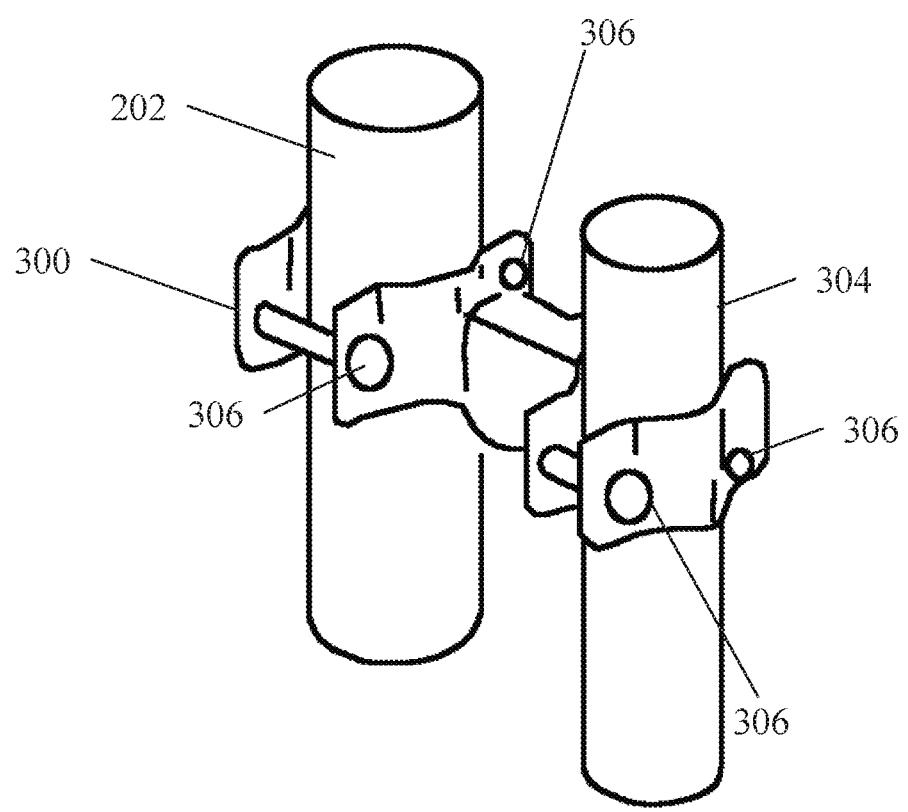
FIG. 3 is a front perspective view of an implementation of a pole coupler of the system of FIG. 1.

Referring now to FIG. 3, an implementation of a clamp 300 is shown. The clamp may be used to couple the telescoping pole to the wheelchair. For example, two cylinders are seen within the clamp just for ease of illustration—one of these cylinders represents the telescoping pole 202 and the other represents a vertical cylindrical member 304 of the wheelchair. The clamp includes tightening bolts 306 to allow the clamp to be tightened around both the wheelchair cylindrical member and the telescoping pole to secure the pole to the wheelchair. The clamp is merely one example of a coupling mechanism that may be used to couple the telescoping pole to the wheelchair—in other implementations other coupling mechanisms could be used. The clamp, however, is useful in that it may allow the telescoping pole to be coupled with the wheelchair without requiring anything to be installed on the arm post of the wheelchair, and further without requiring any tools (in implementations the tightening bolts may be hand-loosened and hand-tightened to achieve a proper fit and for removal).

In implementations the telescoping pole is made of high strength polymer, such as acrylonitrile butadiene styrene (ABS) plastic. The telescoping pole may be heat resistant and may be any color—in the implementation shown it is white.

Figure 4:
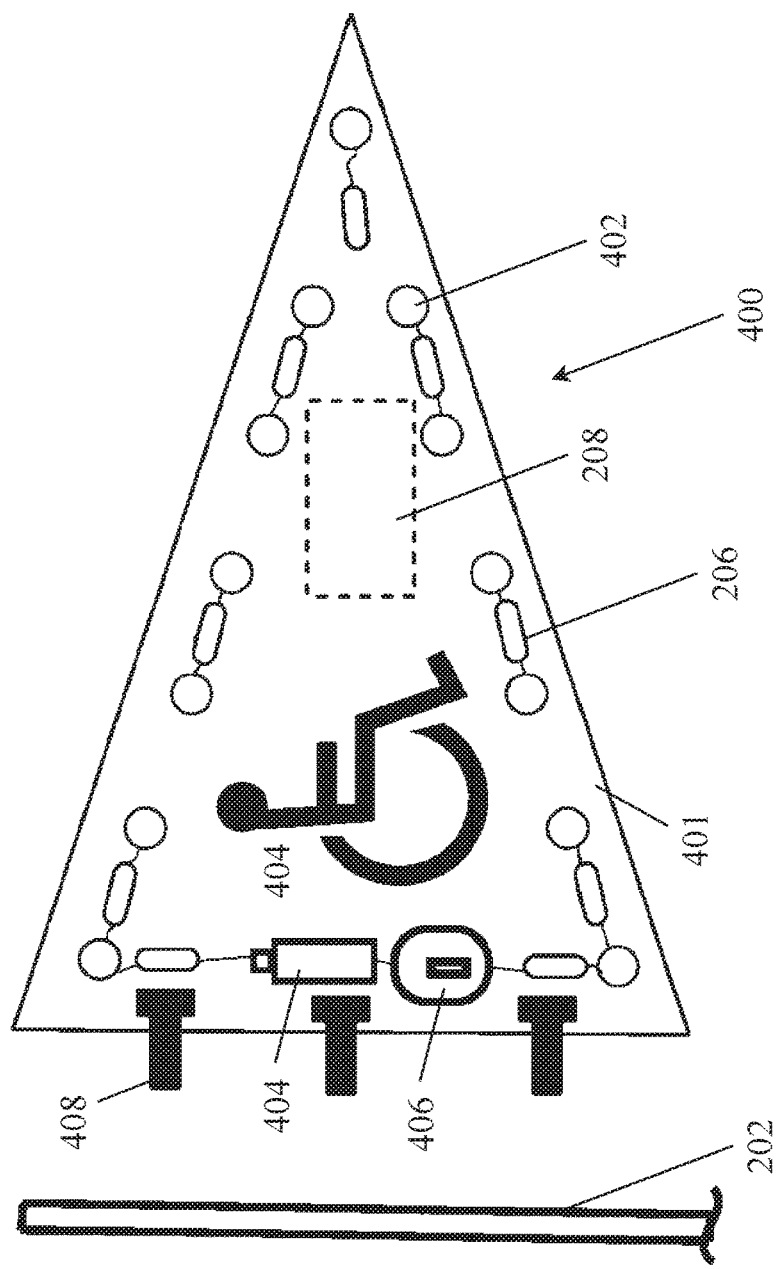
FIG. 4 is front view of an implementation of a pennant assembly of the system of FIG. 1.

FIG. 4 shows an implementation of a pennant assembly 400 that may be used with the system 100. The topmost segment of the telescoping pole is seen to the left of the image, for reference. The pennant assembly is seen to include a flag member 401 which includes an illustration of a common wheelchair symbol, though in implementations this symbol could be replaced with some other symbol, as shown with pennant assembly 500 of FIG. 5 wherein the wheelchair symbol is replaced with a symbol of a military member carrying a wounded military member. A number of through-holes 402 are present in the flag member for a string of lights 206 to be passed therethrough. In the implementation shown the through-holes are 0.25 inch-diameter holes. The string of lights may, in implementations, be a 23-inch LED string assembly, which in implementations includes a power source 404 (which, in the implementation shown, is a lithium or lithium ion battery) and a switch 406 for toggling the power on/off. The switch may thus be toggled to activate the lights, as desired, so that the pennant assembly is illuminated and more easily seen by a vehicle driver. With the lights being strung on both sides of the flag member of the pennant assembly the lights are accordingly visible on both sides, so that vehicles on either side of the pennant assembly will notice the wheelchair-pedestrian.

The chip set 208 is illustrated as embedded within the flag member. Three pennant clips (clips) 408 are attached (in some implementations glued, though other attachment mechanisms may be used in other embodiments) to the vertical side of the flag member and then may be snapped in place on the top of the telescoping pole.

Figure 5:
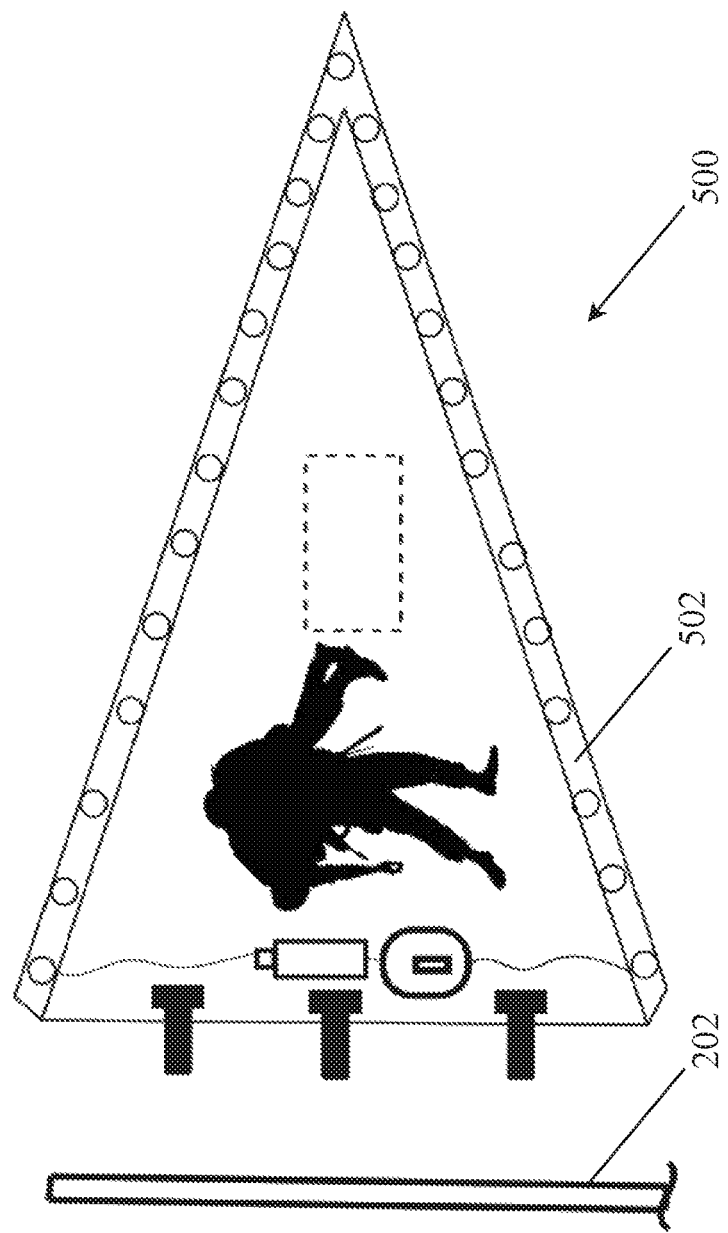
FIG. 5 is a front view of another implementation of a pennant assembly of the system of FIG. 1.

The pennant assembly 500 of FIG. 5 is seen to be in many ways similar to pennant assembly 400, though for lights it uses a micro LED ribbon 502 and, as described above, has a different logo.

In some implementations the pennant assembly could include everything shown in FIG. 4 or 5 but exclude the chip set. In such implementations the pennant assembly would be an inexpensive illuminated pennant simply used to grab the attention of a vehicle driver so that the driver drives with caution. Nevertheless, in implementations in which the pennant assembly includes the chip set the wheelchair-pedestrian's safety is increased, because this takes into account the duality of vehicles that the pedestrian will inevitably face—those without DSRC technology and those with DSRC technology (either enabled from the factory or retrofitted thereafter). Accordingly, devices described herein may be sold as a non-chip set version and as a chip set version, which in either case will help to save lives, protect wheelchair-pedestrians, and protect vehicles from damage.

In implementations the flag portion may be formed of, or may include, light-reflecting materials, to brighten the pennant assembly using any nearby light source. The handicap symbol or logo may be selected or styled to comply with government or municipal codes. In some implementations a single flag member may include two logos, one logo on one side and another on the other side (for example a wheelchair symbol on one side and the military logo of FIG. 5 on the other side, as a non-limiting example). In some implementations the flag member may have removable logos so that a use may select which logo to use, or in some pennant assemblies the pennant could even include a simple display (such as low power e-ink) allowing a user to modify the logo as desired.

In implementations of use of the wheelchair systems the telescoping pole is extended to a fully-telescoped configuration, the pennant assembly is snapped in place on the smallest-diameter segment of the telescoping pole, and the telescoping pole is coupled with a wheelchair (manual or powered) or other non-ambulatory transport using the clamp. The wheelchair-pedestrian may then easily notify a vehicle driver of his/her presence, and the vehicle driver can easily view the wheelchair-pedestrian, in both daylight and nighttime settings.

Figure 6:
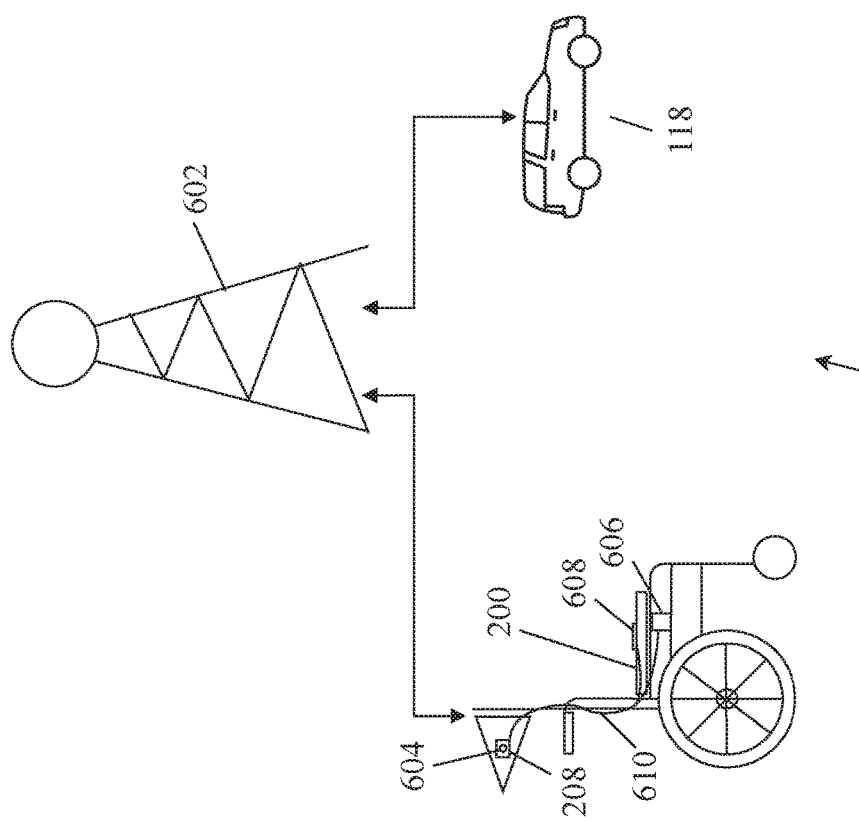
FIG. 6 is a diagram of some components of the system of FIG. 1.

Referring now to FIG. 6, a sub-system 600 is representatively illustrated. Sub-system 600 is a sub-system of system 100 of FIG. 1, and includes the wheelchair 200, a vehicle 118, and a local MIMO tower 602 (which MIMO tower is a sub-portion of the telecommunications network 110 of FIG. 1). The wheelchair is shown in a simplified format only for ease of illustration. The chip set of the wheelchair in this implementation is a cellular everything-to-vehicle (X2V) device designed to be used within a 5G or similar/related Long Term Evolution (LTE) network cellular construct. The chip set in this implementation communicates the presence of the wheelchair (and accordingly a wheelchair-pedestrian) to a DSRC-enabled vehicle 118 to signal to the vehicle driver to drive with caution. The chip set does this by communicating with a local MIMO tower 602 of the cellular network infrastructure.

The local MIMO tower returns an acknowledgement signal to the chip set, which in implementations illuminates a notification light 604 of the chip set 208. In implementations the acknowledgment signal also sounds a sound unit 606 with a sound notification and/or activates a tactile unit 608 with a tactile notification (such as, by non-limiting example, a vibration, a thumping, etc.) (the tactile unit may be an arm rest vibration pad or other element which vibrates, or which vibrates the wheelchair arm rest, and in implementations could be comprised within the arm rest). The sound unit and/or tactile unit may be wired to the chip set with a wire 610. Uplink and download channels may be determined by the Federal Communications Commission (FCC) or other spectrum regulatory body. For example, in some implementations the FCC may assign the 5.8-6.1 GHz spectrum channel for 5G public safety communications and wheelchair-pedestrians may gain free access to this assigned spectrum/channel. This cellular communication exchange informs vehicles equipped with DSRC technology that a wheelchair-pedestrian is within range of the vehicle and in turn notifies the wheelchair-pedestrian that it is safe to proceed or cross a street or the like with minimum risk. In implementations of use of a wheelchair system the wheelchair-pedestrian may be attempting to cross a street or cross in front of a driveway or vehicle entrance/exit so that the notification notifies the wheelchair-pedestrian that it is safe to cross in front of a vehicle at the street or driveway/entrance/exit.

Figure 7:
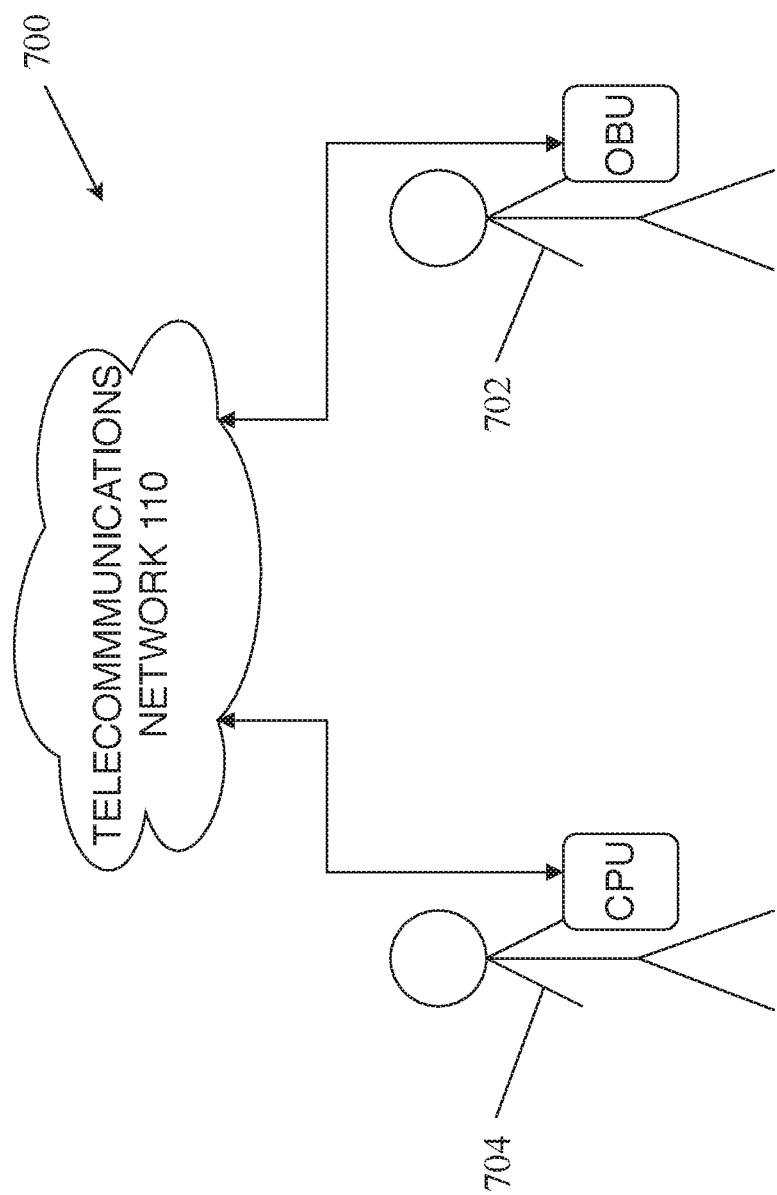
FIG. 7 is a diagram representatively illustrating a method of the system of FIG. 1.

In other implementations, as shown in FIG. 7, a chip set with a Subscriber Identification Module (SIM) card coupled thereto may be used to locate lost pedestrians. For example, a first person 702 may be lost but may have a chip set (labeled "OBU") in their possession. This may be, for example, a child with a backpack or a clothing item or the like, the parents having placed the OBU chip set in the child's backpack or clothing or otherwise on the child for tracking purposes. If the first person 702 becomes lost then a second person 704 may be able to still locate the person by the SIM card being identified to the second person's computing device (labeled "CPU") through telecommunications network 110. The CPU, OBU, and telecommunications network form location system 700, which is in some ways similar to wheelchair system 100 (and may use some of the same elements) but adds the CPU or computing device of the second person.

For example, the OBU chip set of the lost person, coupled with the SIM card, may communicate with a local cell tower, and through this cell tower a signal or notification may be sent to the computing device (such as a computer, tablet, smart phone, etc.) of the second person notifying them of the location of the lost person. This may include a global positioning satellite (GPS) location of the lost person (and in such cases the chip set may include or be coupled with a GPS chip). The first person could be someone other than a child, such as a hospital patient, a student, an inmate, a mental health patient, a mentally or physically disabled person, and so forth. The second person could be someone other than a parent, such as a law enforcement officer, a doctor, a warden, a teacher, and so forth. The second person may, in implementations, locate the first person by utilizing a software application installed on the computing device (CPU), which may for example access the application server 112 to locate the GPS location of the first person. The coupling of the SIM card with the OBU chip set thus allows identifying and location information to be provided from the cloud or telecommunications network to a public authority or the like in search of a missing subscriber.

Figure 8:
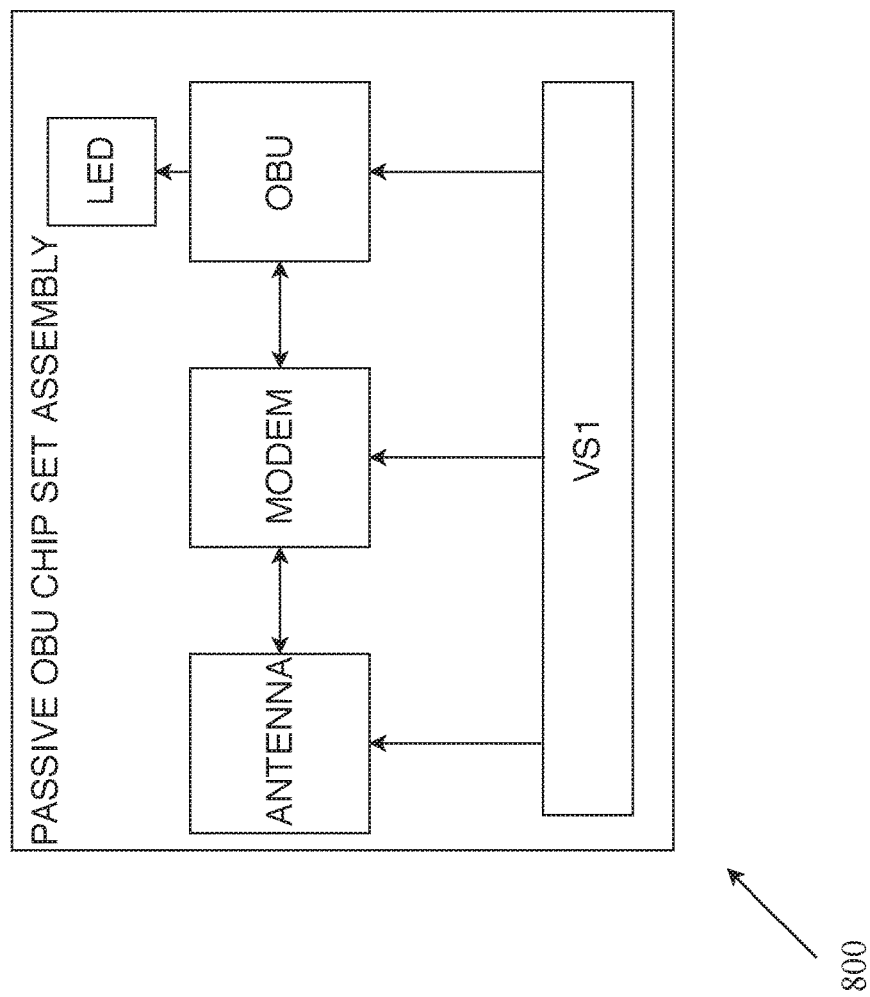
FIG. 8 is a block diagram of an implementation of a passive OBU chip set assembly of the system of FIG. 1.

Referring now to FIG. 8, a representative implementation of a passive on board unit (OBU) chip set assembly (chip assembly) 800 is shown. This chip assembly is an X2V device designed to be used within a 5G (or related LTE) network construct. The purpose of the chip assembly 800 is to communicate to DSRC-enabled vehicles the presence of a wheelchair-pedestrian equipped with the chip assembly and to signal to the vehicle to drive with caution. The chip assembly may be powered by a lithium or lithium ion battery (labeled VS1) to communicate with a local MIMO tower and transmits a signal (assigned by the FCC or other spectrum regulatory body) to inform nearby vehicles within 120 yards of the wheelchair-pedestrian, and enabled with DSRC technology, of the presence of the wheelchair-pedestrian. To accomplish the communication link the chip assembly includes an OBU chip set as described previously that acts as a transceiver to generate a caution signal to the local MIMO tower, a modem used to uplink the caution signal, the battery to power the OBU chip set, an antenna to detect signal transmissions, and an acknowledgement LED (labeled LED) which illuminates when the wheelchair-pedestrian's presence has been acknowledged by the acknowledgement signal.

Figure 9:
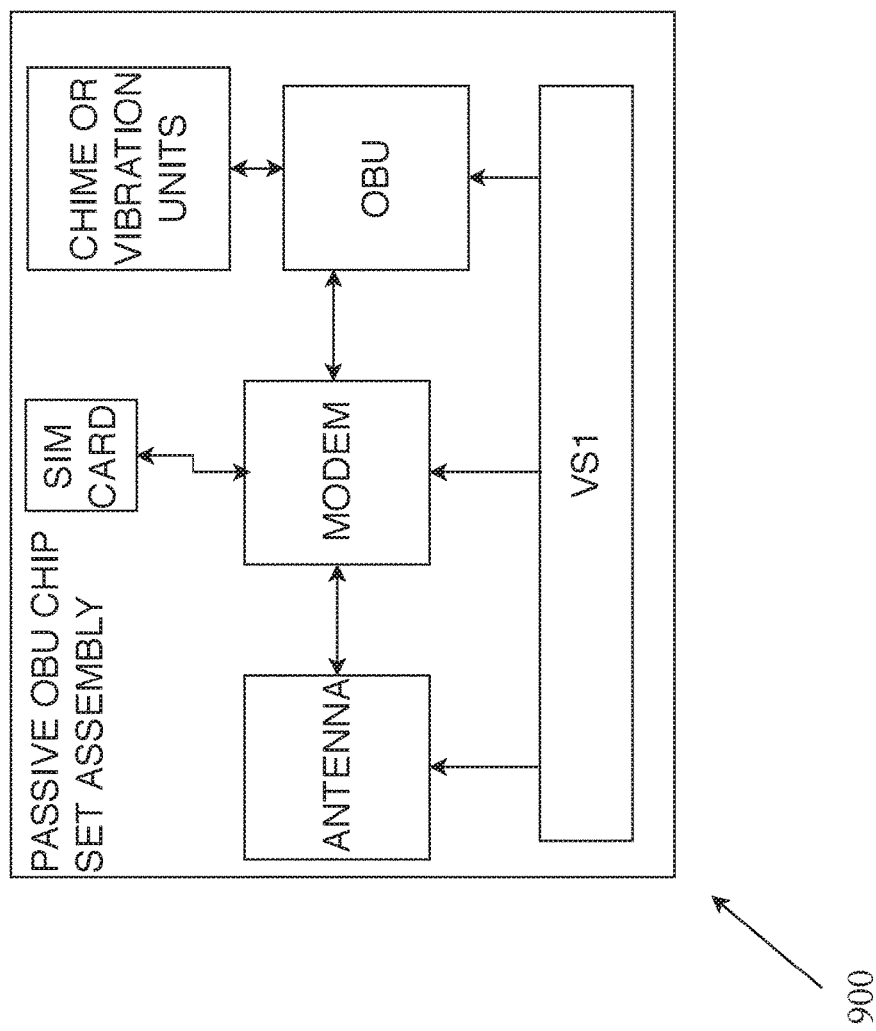
FIG. 9 is a block diagram of another implementation of a passive OBU chip set assembly of the system of FIG. 1.

FIG. 9 shows a representative implementation of a passive on board unit (OBU) chip set assembly (chip assembly) 900. This chip assembly is an X2V device similar to chip assembly 800, and has similar elements except it also includes a SIM card (as has been described above for some system and method implementations) and also includes a sound unit or tactile unit (or is coupled thereto) instead of the LED. The tactile unit may be a vibration pad placed on the arm of the wheelchair, as shown with the tactile unit 212 of FIG. 2 and the tactile unit 608 of FIG. 6. The sound unit may be also placed on the arm of the chair, as with the sound unit 210 of FIG. 2, though it may also be placed elsewhere as with the sound unit 606 of FIG. 6. FIG. 2 does not show any cords attached to the tactile unit or sound unit though they may be coupled with the OBU chip set with cords/wires and/or they may be wirelessly coupled therewith. When the SIM card is used it may store information of the wheelchair-pedestrian for authorized GPS location services. This was described above in the context of locating a non-wheelchair-pedestrian, but it may also be used in the context of locating a wheelchair-pedestrian.

Additional implementations of passive on board unit (OBU) chip set assemblies (chip assemblies) are discussed below. These implementations are in some ways similar to those described above and in some ways different. The following embodiments may be considered wearable technology in some implementations, may be connected to the Internet of Things (IoT) and may be used to passively (i.e., automatically) communicate to vehicles equipped with DSRC technology. In the event of a wheelchair-pedestrian accident, the chip assemblies and/or systems may automatically transmit an alert message to emergency services and to one or more subscribers of record who has chosen to receive (and/or who has been chosen by a wheelchair-pedestrian to receive) such notification messages. This may be implemented by the users' and/or subscribers' communication information and notification selections being stored in the database of system 100 using one or more user interfaces shown on a display 122 of a user computing device 120 coupled with the system (as seen in FIG. 1). The computing device could be any type of computing device (desktop personal computer, laptop, tablet, smart phone, etc.), and the shown image of a smart phone is only a representative example. Such storage of settings in the database may be done through one or more software applications installed on the computing device and accessed by one or more users.

The implementations described below may, in implementations, be worn by wheelchair-pedestrians (such as a watch device or some other wearable technology). In other implementations they will be coupled with a wheelchair or other ambulatory device. They may be used while the user is traversing traffic in a 5G cellular environment. The safety of the wheelchair-pedestrian is increased by the passive (automatic) communication of a safety warning Travelers Information Message (TIM) (notification signal) identified by the Society of Automotive Engineers (SAE) and the National Highway Traffic Safety Administration (NHTSA), issued over the Internet by cloud service software to area vehicles equipped with DSRC technology, thus notifying through the vehicle dashboard or console by an instrument-light or other visual or audio notification that a wheelchair-pedestrian is in the area and to proceed with caution. In implementations the vehicle equipped with DSRC technology sends an acknowledgement Basic Safety Message (BSM) to the wheelchair-pedestrian's chip assembly device through cloud processing servers triggering a resident LED of the chip assembly to illuminate. This message exchange accomplished in the cloud's software function (which may be governed by a government agency such as the Department of Motor Vehicles (DMV) or NHTSA, using their servers) gives the wheelchair-pedestrian the confidence that vehicles are seeing, or are at least electronically notified of, the presence of the commuting wheelchair-pedestrian, through the 5G cellular network.

In the event of an accident, the chip assembly may enter an emergency state driven by software derived from geospatial algorithms resident in the chip assembly. When these algorithms are activated the software automatically sends out emergency alert messages through the cloud to police and/or emergency personnel. Additional notification messages (notifying of the accident event) are sent to individuals associated with a SIM card. The accident event may be the wheelchair being overturned, for example, though it could also be the wheelchair being struck by a vehicle even if it is not overturned (for example determined by a quick change in direction or acceleration). DMV subscriber profile information of nearby DSRC vehicles may be also sent to DMV or stored in the database and associated with the accident event such as for later investigative and/or evidentiary purposes. This all occurs, in implementations, passively. In other words, all of this functionality is accomplished without the wheelchair-pedestrian's operation of any control panel or the like.

Figure 10:
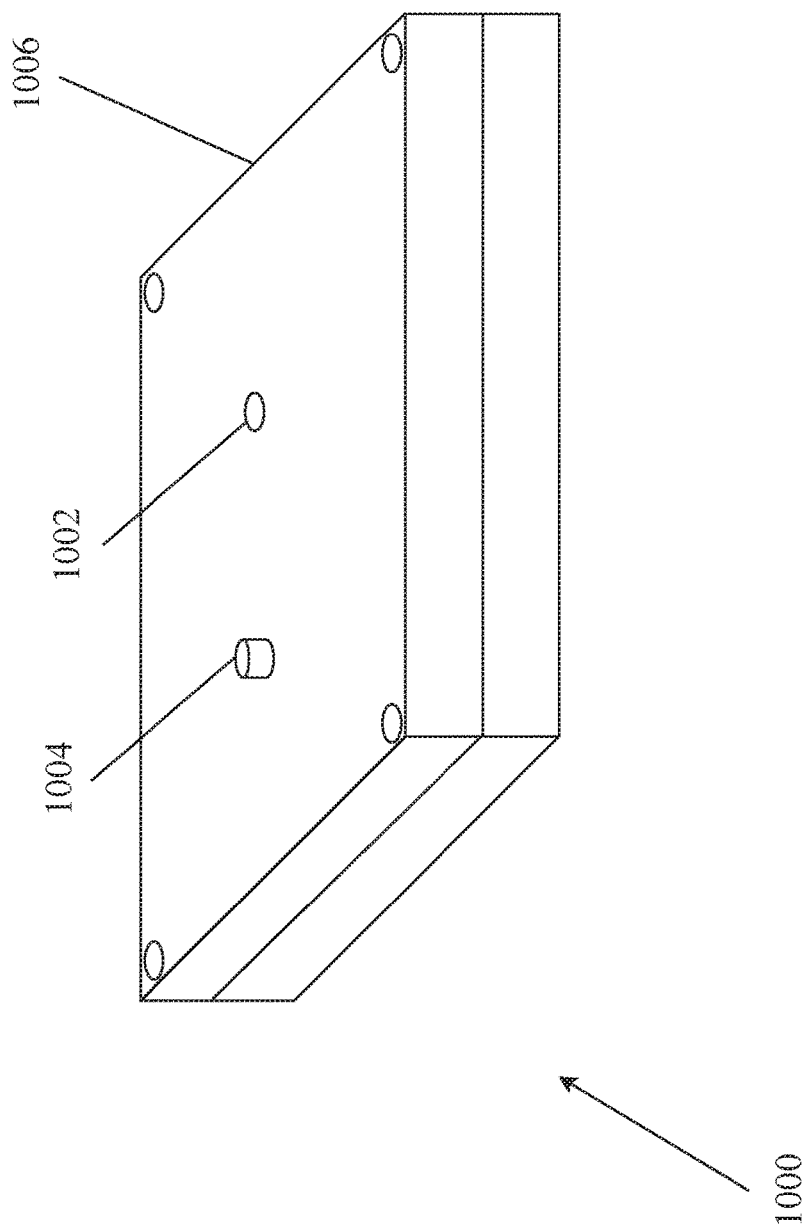
FIG. 10 is front perspective view of another implementation of a passive OBU chip set assembly in a closed configuration.

Referring now to FIG. 10, an alternate embodiment of a passive on board unit (OBU) chip set assembly (chip assembly) is representatively illustrated. The passive on board unit (OBU) chip set assembly (chip assembly) is seen to include a housing 1006 with upper and lower members and, exposed on an exterior of the upper member, a light 1004 and a reset switch 1002. In implementations the reset switch has three positions: reset; light test; and normal ON. The light in the implementation shown is an LED and is used to notify the wheelchair-pedestrian when an acknowledgment signal has been received, as has been described above.

Figure 11:
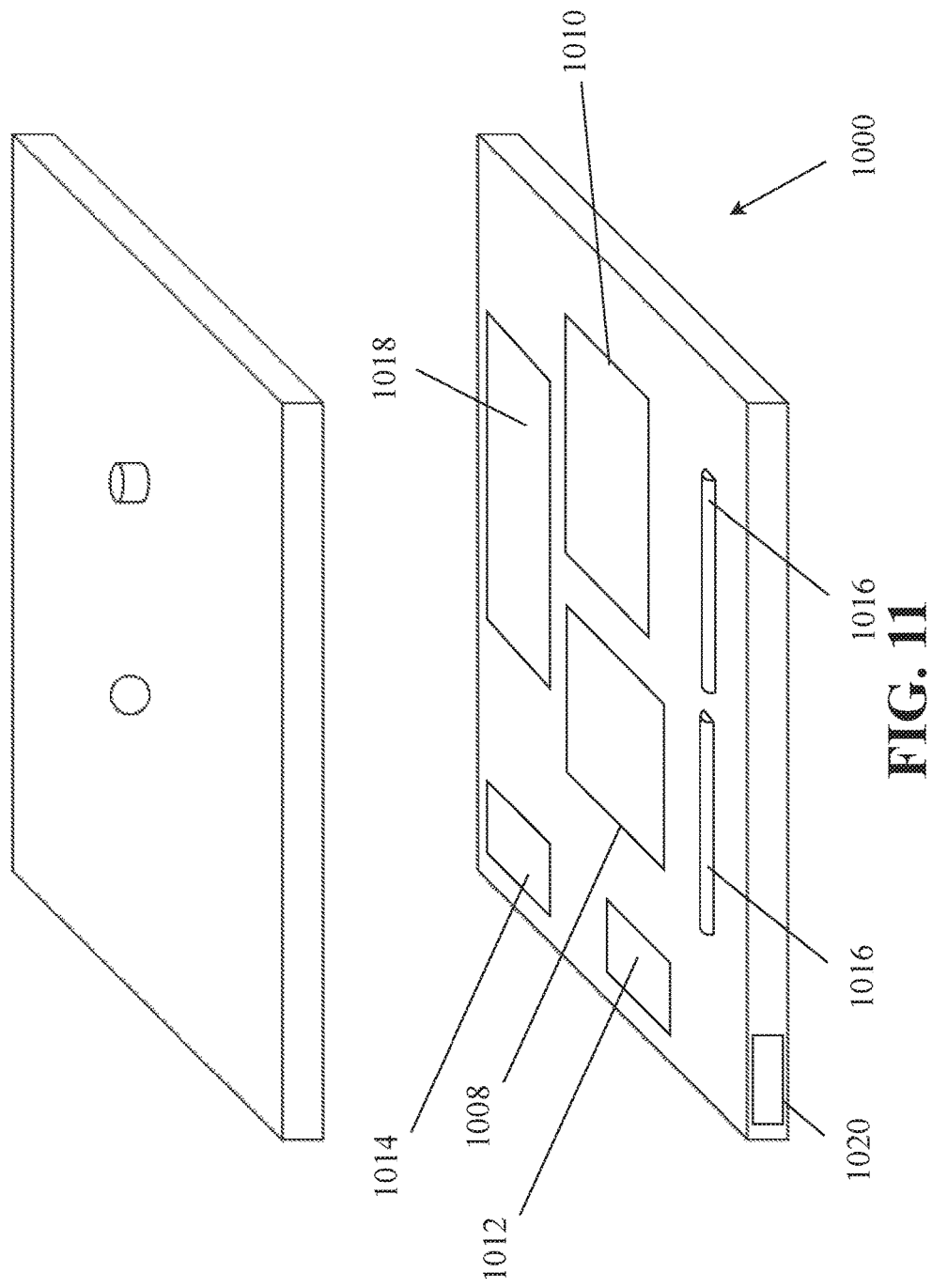
FIG. 11 is a front perspective exploded view of the passive OBU chip set assembly of FIG. 10.

Referring to FIG. 11, which is an exploded view of the chip assembly of FIG. 10, the chip assembly is seen to include a system on a chip (SoC) 1008. In implementations the SoC is, or includes, a wireless communication chip. The SoC in implementations may be a programmable Soc (PSoC). In implementations the SoC 1008 comprises an Embed ARM v7-R PSoC architecture. Other chip set embodiments could be used, such as a SNAPDRAGON 845-50 SoC, a CYPRESS PSoC, a HUAWEI BALONG SoC, a NOKIA REEFSHARK SoC, an APPLE A11/BIONIC/A10 FUSION SoC, and so forth. However, the ARM v7 was selected because of its desirable performance, price and dual-core speed. Other elements shown are a SIM card 1010, a GPS unit 1012, an antenna 1014, a number of batteries 1016, and memory 1018. The memory and SoC may work together using an API geospatial algorithm to identify an accident profile, for example to determine that a wheelchair-pedestrian's wheelchair has been overturned.

FIG. 11 also reveals that, in implementations, the chip assembly includes a USB port 1020. The USB port may be used to connect other devices to the chip assembly to power other devices, such as for example powering a cell phone with the chip assembly. The chip assembly is nevertheless a self-contained device, in implementations, and the USB port in such implementations does not provide any communicative coupling other than providing power—for example, in such implementations the USB port is not used to charge the chip assembly, or to provide data to the chip assembly, and does not connect to power of the wheelchair, etc. Nevertheless, the chip assembly is configured to wirelessly couple with DMV servers through the cloud to interface with the DSRC devices and vice versa.

Figure 12:
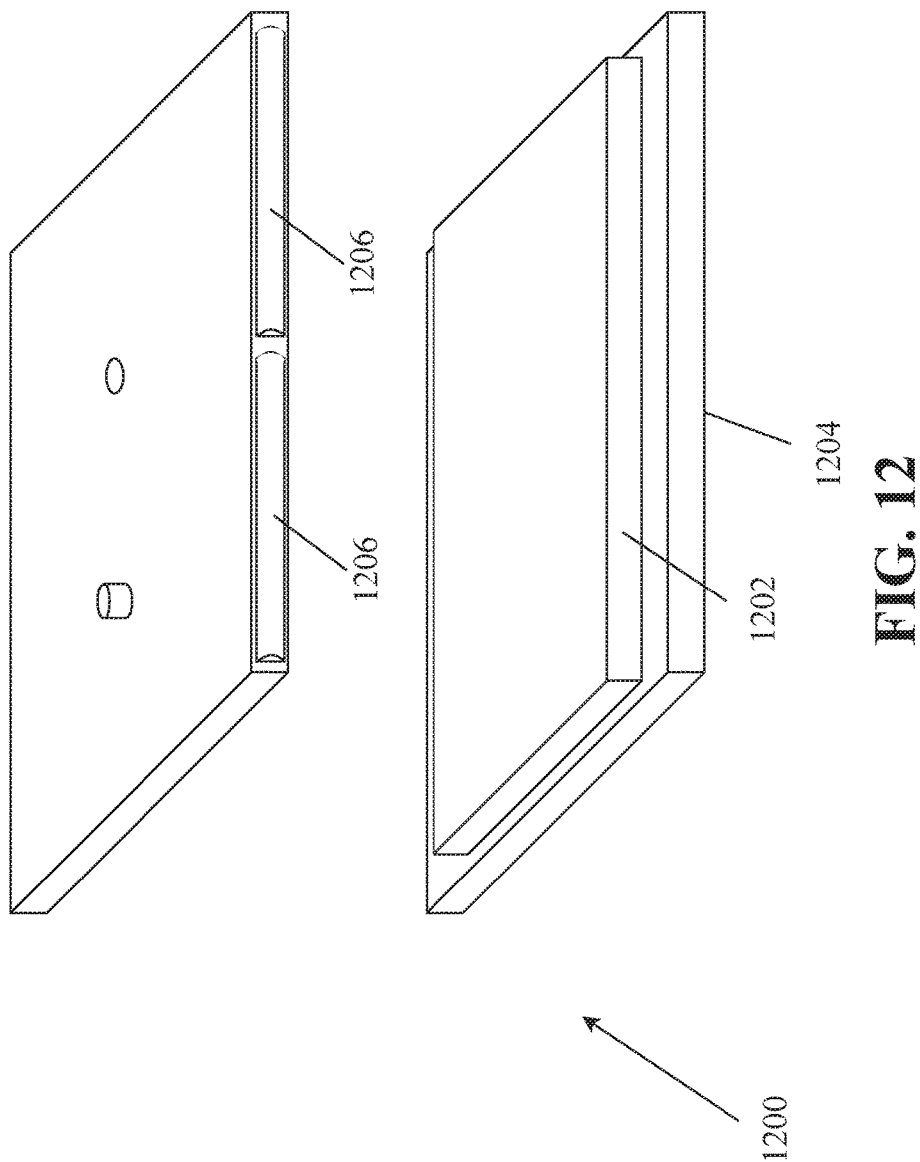
FIG. 12 is a front perspective exploded view of another implementation of a passive OBU chip set assembly.

FIG. 12 shows a passive on board unit (OBU) chip set assembly (chip assembly) 1200 which is in some ways similar to chip assembly 1100 except a lithium-graphene solid state battery 1202 has been added. The top housing in this implementation has existing lithium ion batteries 1206 which may be left in place or which may be removed. A solar panel 1204 is added to the bottom of the lower housing (though in use this side may face the sun or other light source) to charge the battery 1202 and/or batteries 1206. This implementation adds about 16 ounces to the weight of the chip assembly but the solid state lithium-graphene battery combined with the solar panel allows the chip assembly to be powered without the user needing to ever plug in the device or recharge the batteries using anything connected to an electrical outlet. In implementations the solar panel may be a KINETECO miniature solar panel. In implementations the solar panel may be used for charging the battery(ies), though in implementations it may also be used to directly power the device.

Figure 15:
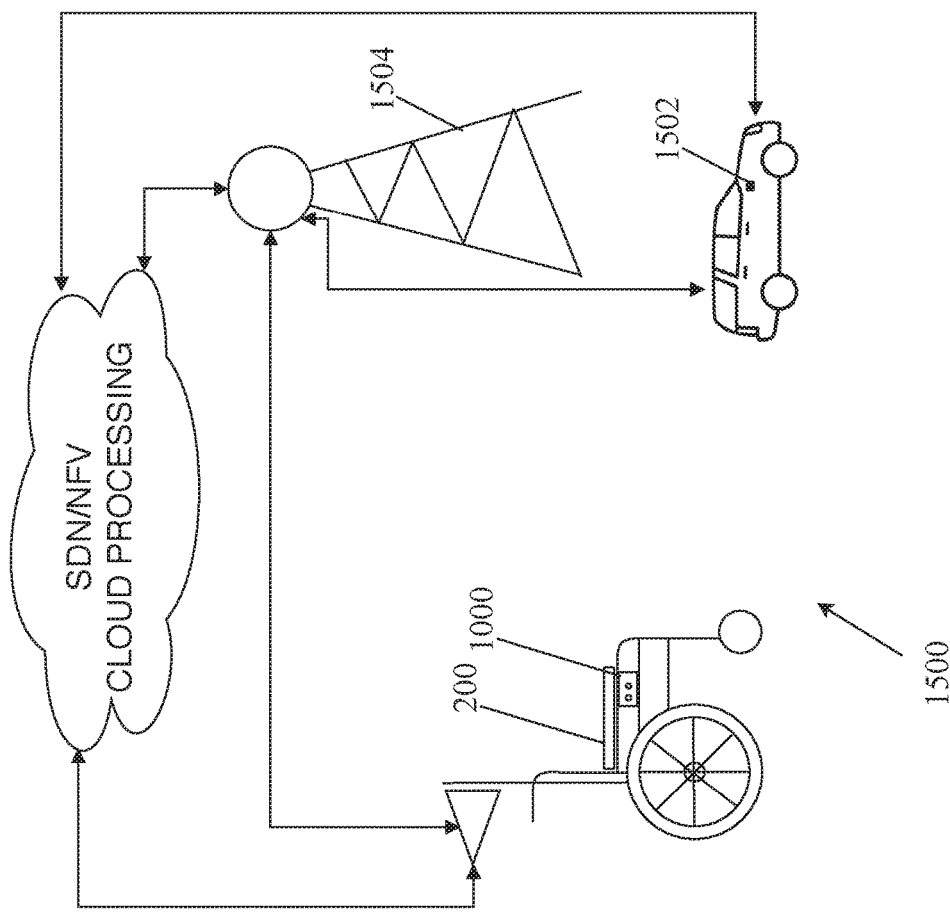
FIG. 15 is a representative illustration of a sub-system of the system of FIG. 1, illustrating a broadest communication path between a passive OBU chip set assembly and a vehicle.

The chip assembly 1000 may be installed within a pennant, as has been described above for other chip assemblies or chip sets, and in implementations covered with a hermetically-sealed ABS plastic protective enclosure. As seen in FIGS. 2 and 15, however, the chip assembly 1000 may also or instead be installed on the wheelchair in other locations, such as on a right side or left side panel or otherwise below right and/or left armrests. Because of 5G technology the location of the chip assembly 1000 does not limit its functionality.

In some implementations the chip assembly 1000 may be attached to a flag member of a pennant assembly using a hook-and-loop fastener. In other implementations, the chip assembly may be coupled with the pennant assembly or any wheelchair element using any coupling mechanism, though hook-and-loop fasteners provide for quick and secure attachment and removal.

In implementations the chip assembly 1000 may be employed as a temporary alert device. For example, at an event the event organizers may utilize one or more chip assemblies, attaching them to local structures (for example light poles or other fixtures), to advertise the event or details of the event to local motorists whose cars are equipped with DSRC technology. These advertisements may be broadcast through an appropriate information source ad channel.

In implementations the chip assembly 1000 may be employed as a roadside assistance (temporary roadside alert) device to broadcast to nearby vehicles equipped with DSRC technology that a wheelchair-pedestrian is in need of assistance, for example if the user's wheelchair has fallen over or is stuck of if the user is otherwise nonresponsive or in need of assistance.

Figure 13:
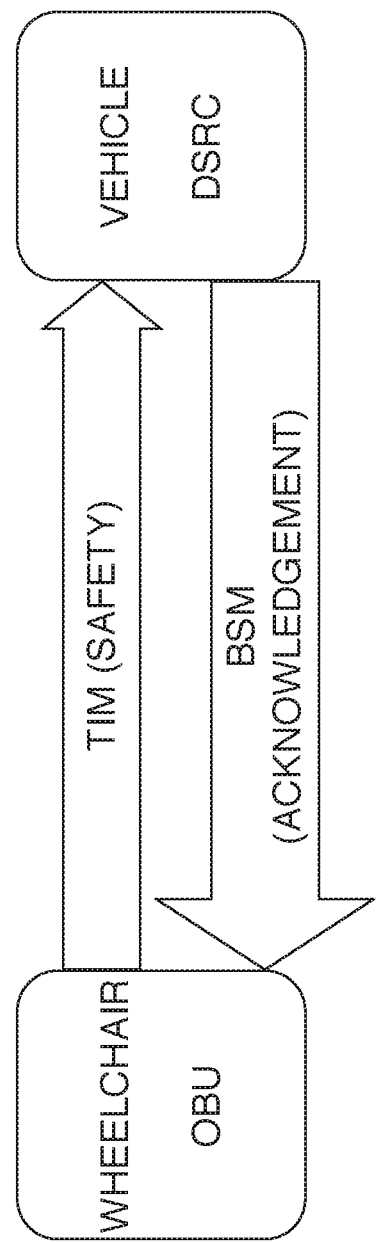
FIG. 13 is a block diagram representatively illustrating communication paths between the passive OBU chip set assemblies of FIGS. 10 and 12 and a vehicle.

FIG. 13 representatively illustrates communication between a DSRC device of a vehicle and a wheelchair OBU chip assembly. As can be seen, the Traveler's Information Message (TIM) is sent from the chip assembly to the vehicle DSRC unit, and a Basic Safety Message (BSM) or acknowledgment message is returned. As described previously, this communication may go through one or more intermediaries such as cell towers, the Internet, and so forth. In implementations the exchanges are communicated on a channel lying within 5.9-6.1 GHz assigned by the FCC for public safety communications.

Figure 14:
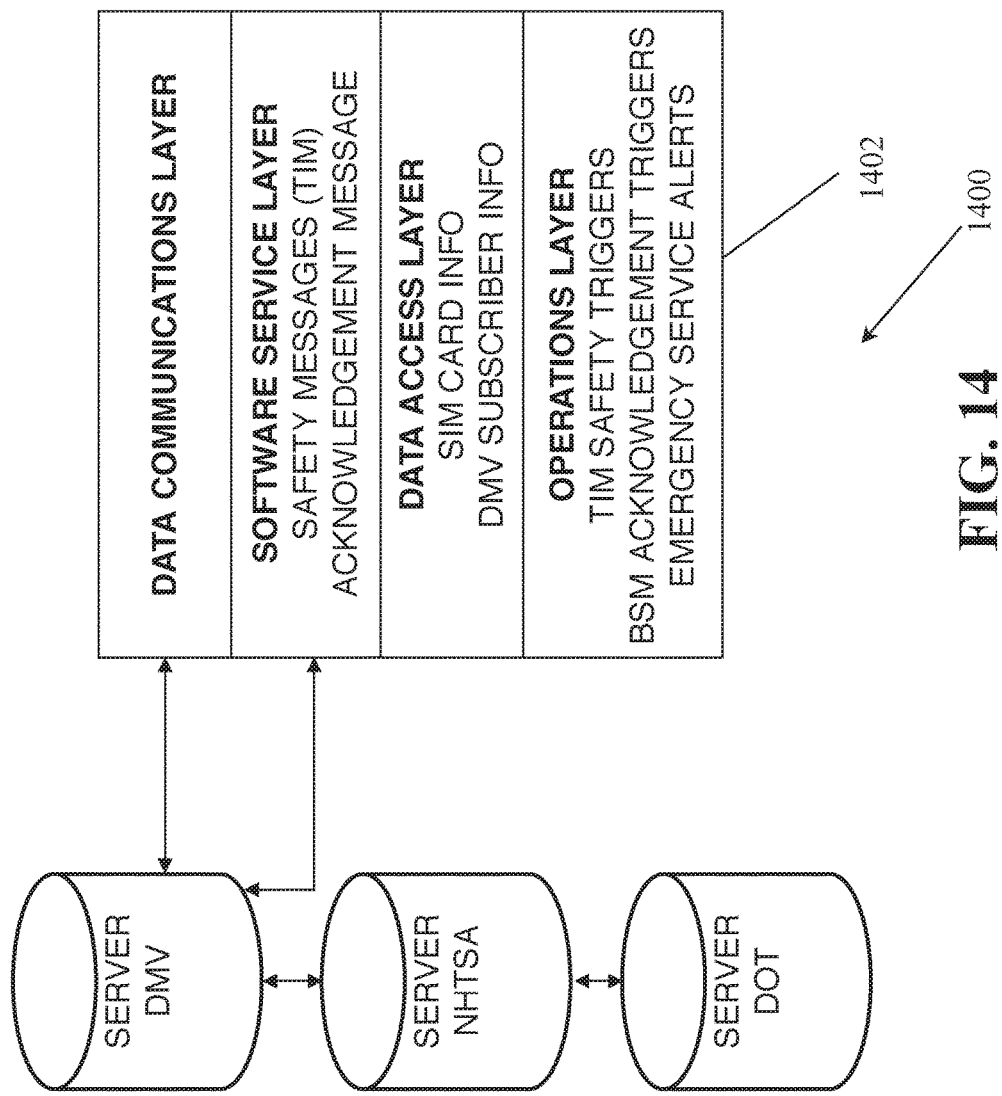
FIG. 14 is a block diagram representatively illustrating a sub-system of the system of FIG. 1, showing software structure and server connections.

Referring now to FIG. 14, a sub-system 1400 is shown. In implementations sub-system 1400 is a sub-system of system 100. A software application structure 1402 is representatively illustrated. In implementations structure 1402 may be arranged on a typical dual-core chip (such as the ARM v7-R Embed PSoC previously described). The data communications layer and software services layer receive updates from the data access layer, the SIM card, and the DMV record. In implementations the data communications layer transfers data between applications. In the event of an accident the operations layer (which in implementations may be driven by Mission Critical Services of the NHTSA services) sends alert messages to police and emergency personnel (it accordingly handles user communications). Additionally, notification of an accident to the wheelchair-pedestrian's caregiver and/or other persons of record with subscriber information contained at the DMV servers and stored on the SIM card are issued over the Internet.

As is shown in FIG. 14, the DOT, NHTSA, and DMV servers may communicate with one another and with one another's databases to accomplish these functionalities. The operations layer may utilize the API geospatial algorithm to identify an accident profile. The DOT servers may transfer data to the NHTSA servers (such as policies), the NHTSA servers may transfer data to the DMV servers (such as policy of safety message usage), and the DMV servers may transfer data to the wheelchair subscriber devices (chip assemblies) (to the data communications layer and the software services layer), in other words the DMV servers may communicatively link to the wheelchair subscriber devices (chip assemblies).

FIG. 15 shows a sub-system 1500, which in implementations is a sub-system of system 100. A vehicle is shown with a DSRC device 1502 for DSRC communications. The previously-described passive chip assemblies may allow wheelchair-pedestrians and similar non-ambulatory transporting equipment to automatically communicate with a communication tower 1504, which in implementations is a local MIMO tower, to inform DSRC-equipped vehicles about the presence of a wheelchair-pedestrian. The chip assembly in implementations may be powered by a lithium or lithium ion battery and may be a slave to a cloud signal processing Software Defined Network (SDN) architecture or Network Function Visualization (NFV) applications that host an uplink beacon between the local MIMO tower and the cloud and broadcast TIM safety signals to vehicles with DSRC technology and acknowledgement signals through cloud processing to wheelchair-pedestrians with chip assemblies.

In implementations the chip assembly communicates with the cloud software processing through the channel provided by the local MIMO tower. The cloud signal processing architecture in implementations may include a Software Defined Network (SDN) or Network Functions Virtualization (NFV) applications that host an uplink between the local MIMO tower and the cloud and broadcast TIM safety signals to vehicles with DSRC technology and acknowledgment signals to wheelchair-pedestrians with chip assemblies. In implementations there may thus be a TIM signal uplink to the communications tower, a TIM signal uplink to the cloud for signal processing, TIM cloud signal processing (SDN/NFV), TIM safety signal broadcasting to DSRC devices, BSM signal uplink to the communications tower, BSM signal uplink to the cloud for signal processing, BSM cloud signal processing (SDN/NFV), and BSM acknowledgment signal broadcasting to chip assemblies.

Figure 16:
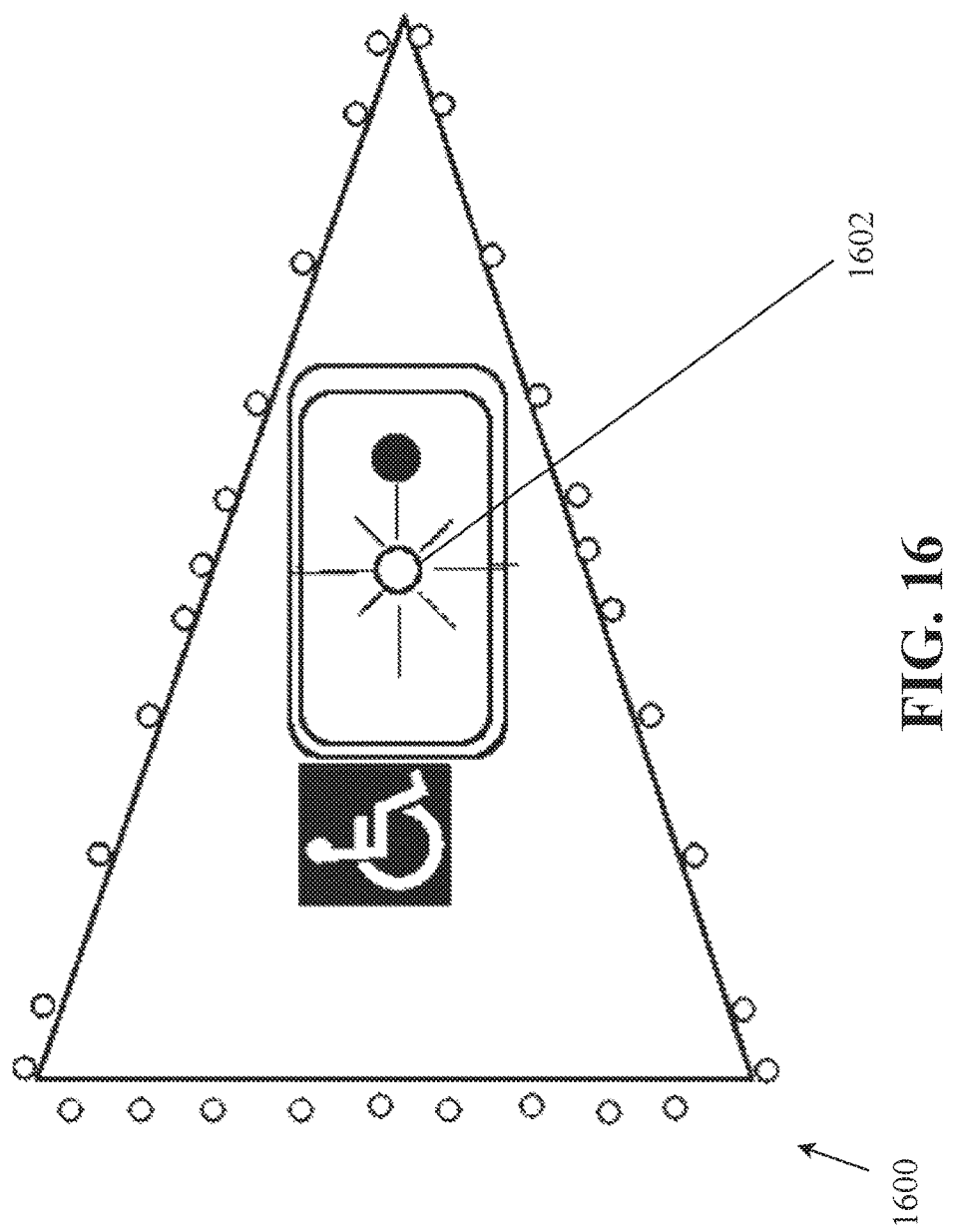
FIG. 16 is a front view of an implementation of a pennant assembly of the system of FIG. 1, representatively illustrating a DSRC acknowledgment response to an OBU chip set assembly caution TIM message.

Referring now to FIG. 16, an implementation of a pennant assembly 1600 is shown. The pennant assembly includes a chip assembly, and when a wheelchair equipped with the chip assembly rolls into the circular (or spherical) vicinity of a MIMO tower and a vehicle equipped with DSRC technology is present, the light 1602 of the chip assembly illuminates as shown in FIG. 16 until the DSRC-enabled vehicle has moved or the wheelchair has crossed the street and moved away (in implementations about 120 yards, or more than 300 yards, or in other implementations within 100 feet, or a smaller distance, or a distance greater than 300 yards).

In implementations, in addition to or alternative to the light being illuminated, a chime or sound notification may be utilized using a sound unit 606 or a vibration or other tactile notification may be utilized using tactile unit 608. The presence of the broadcast acknowledgment of the BSM signal will trigger illumination of the light, or vibration or other tactile notification of the tactile unit (which in implementations may be a vibration pad), or a sounding of the sound unit. In implementations there may be a cable coupling the chip assembly with the tactile unit and/or a cable coupling the chip assembly with the sound unit for power and/or signal communication, though in other implementations the tactile unit and/or sound unit could be independently powered and wirelessly communicatively coupled with the chip assembly.

In the event of an accident the position of an overturned wheelchair may be assessed by geospatial algorithms equipped with accident protocols and will result in the chip assembly reading the DMV subscription file in the cloud or uploading the SIM card contents to the cloud for processing and issuing medical alert messages to local police and local emergency services and notifications messages to caregivers and family members listed on subscriber records.

Figure 17:
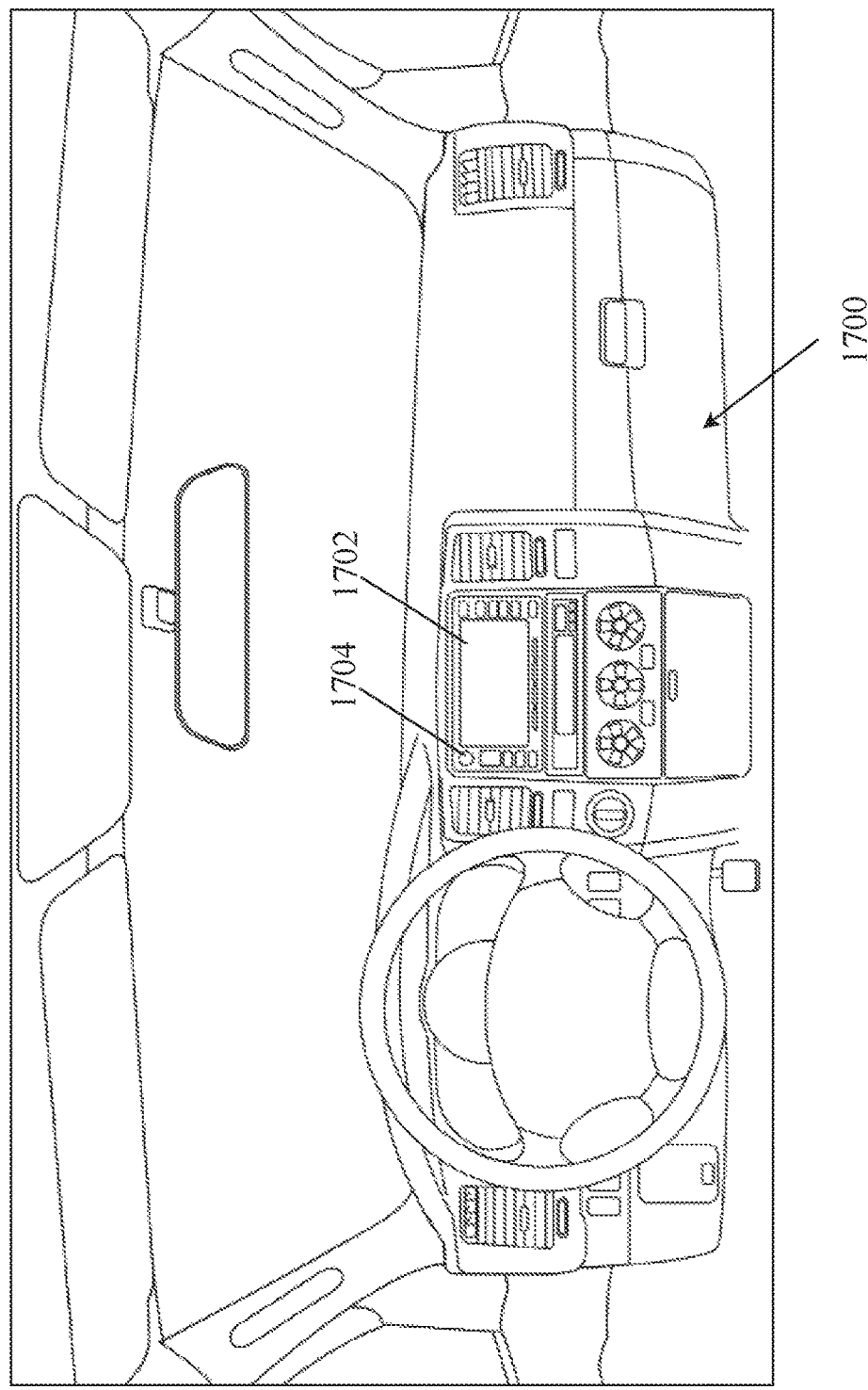
FIG. 17 is a dashboard view of a vehicle of the system of FIG. 1.

In implementations the chip assemblies and related devices comprise a wheelchair safety system or a wheelchair system. The chip assembly may comprise a passive safety signaling device and may be designed to operate most effectively in a 5G environment and may derive the messages it communicates by SAE protocols/rules hosted on NHTSA servers, to communicate with a wheelchair (or similar non-ambulatory equipment) to notify DSRC-equipped vehicles of the presence of a wheelchair-pedestrian in the vicinity and to proceed with caution through an intersection or thoroughfare. The vehicle equipped with DSRC technology in turn sends an acknowledgment BSM message to the wheelchair-pedestrian's chip assembly in the form of a signal that triggers the illumination of the chip assembly's light (and/or tactile unit and/or sound unit). The mutual safety communication is visually seen by both the motorist and the wheelchair-pedestrian by the aforementioned light and by a light 1704 on the dashboard 1700 or console of the vehicle, as seen in FIG. 17, and/or by a visual notification on a display 1702 on the dashboard 1700 or console of the vehicle, and/or by a sound notification through the vehicle's radio, and/or by a tactile/vibration notification communicated by the steering wheel or seat of the driver, and so forth. In the event of an accident (either with a DSRC-equipped or non-DSRC-equipped vehicle), the chip assembly sends real time alert messages to local police and emergency services and notification messages to subscribers on record through cloud processing software.

Thus, as described, in implementations a PSoC chip set is installed in a chip assembly with the capability to submit an SAE safety message to a DSRC device and receive an SAE acknowledgement message from a DSRC device while both are engaged in traffic. The portable chip assembly is attached to a wheelchair or other non-ambulatory equipment or any roadside temporary reporting structure (such as the light pole described above). In implementations the chip assembly includes a PSoC chip set or SoC chip set, a SIM card containing subscriber information, an API instruction set, a 64k RAM memory for data storage, a modem to transmit safety messages to a local MIMO tower, an antenna to detect and to trigger TIM signals and detect broadcast BSM acknowledgment signals, a global positioning system chip to determine location and safety state of the wheelchair-pedestrian (identified as a subscriber), a lithium battery to supply power to the chip assembly functions, a light (which in implementations may be amber, though any other color may be used in other implementations) to represent BSM acknowledgment, and a three-position reset switch/button (for reset, light test, and normal on function).

The API program may be downloaded to memory to prescribe the communication between the chip assembly and the DSRC in the cloud equipped with a Software Defined Network (SDN) or Network Function Virtualization (NFV) features, these communication functions being accomplished with a portable chip assembly device. The chip assembly and system may effect the communications without any operator input(s). Accordingly, in implementations the chip assembly may have no user controls to allow the user to govern communications with the DSRC or cellular infrastructure (apart from turning the device on/off).

In implementations the automatically delivered safety message (TIM) and acknowledgment message (BSM) are stored/processed using remote (cloud) processing/storage and using a cloud-controlled MIMO tower, delivering the safety message from the cloud to be broadcast in sequence initially to area DSRC devices and then the acknowledgment message is broadcast to the area chip assemblies.

In implementations the DMV subscriber data stored in the cloud is sent to subscribers on record in the event of an accident. In implementations data is stored on a SIM card and sent to subscribers listed on record in the event of an accident. In implementations a geospatial algorithm is downloaded on the chip assembly to determine an accident event. In the event of a wheelchair-pedestrian accident the accident profile contained in the chip assembly is configured to trigger cloud processing and to send real time alert messages to police, emergency services, and in implementations DSRC insurance providers. The geospatial algorithm may also get data from the DMV subscriber record and/or subscriber-provided SIM card data and send notification messages to persons, such as caregivers, listed on the subscriber's record.

In implementations vehicles within 100 feet of the wheelchair-pedestrian may be notified of the wheelchair's presence. In other implementations vehicles within 120 meters or within 300 meters may be notified. In other implementations vehicles within fewer than 100 feet, or greater than 300 meters, may be notified.

In implementations the OBU signals may be transmitted and/or processed by a QUALCOMM or SNAPDRAGON chip set or SoC or PSoC. For cars equipped with DSRC the communications between the DSRC device and the chip assemblies may be part of the handshake the OBU/chip assembly makes with the DSRC device.

The vehicles described herein may be human-driven vehicles or autonomous vehicles. Although the devices and systems described herein may use 5G communications, in implementations other communications could be used, such as WiFi.

In implementations the battery size and the overall chip assembly size are relatively small so that the chip assembly may be compact and easily placed on or within a pennant assembly or in or on other places on a wheelchair.

Although versions of wheelchairs described herein include the various elements such as a chip assembly, lights, and so forth, in implementations these elements may be sold separately to a user for attachment to an existing wheelchair.

Implementations of wheelchair systems and methods described herein could be used by the National Highway Traffic Safety Administration (NHTSA) to provide local traffic conditions related to highway and road repairs (portable roadside alerts). Implementations of wheelchair systems and methods described herein could be used for bicycles (privately owned, rented, etc.) as advertising mechanisms, to announce local events, and/or for parking directions. Implementations could also be used to provide safety for bicyclists similar to that described for wheelchair-pedestrians. In implementations the systems and methods described herein could be used to provide advertising (for example on a spectrum different than a safety spectrum), such as for promoting products and services to temporary event attendees.

In implementations the Department of Transportation (DOT) may ensure that MIMO towers enabling effective millimeter-wave connectivity are positioned in a way to maintain real-time communication with low latency between autonomous vehicles/vehicles retrofitted with DSRC technology and wheelchairs equipped with the chip assemblies and/or other elements described herein. In implementations the NHTSA may issue new safety messages (such as indicator lights, text, and/or audio messages) to maintain and improve the public's safety while traversing streets and crossing thoroughfares.

In implementations, after receiving an application from a potential wheelchair-pedestrian, the Department of Motor Vehicles (DMV) could register the wheelchair-pedestrian as a subscriber to the system through an interface displayed on a display of a DMV computing device coupled with the system (such as system 100) through the telecommunications network (the DMV selections and etc. being stored in the database). The DMV may register these public subscribers into a software-defined network (SDN) of the system (such as system 100) for communications processing when the wheelchair subscriber's chip assembly is automatically connected to controlling cloud services. Such cloud services are subject to change and grow. When the DMV SDN is updated the reset button or switch 1002 may need to be reset. The DMV may deliver the application programming interface (API) to approved subscribers using a cell phone.

In implementations, one or more chips of the chip assembly comprises a wireless communication chip. As used herein, the term "chip" refers to an integrated circuit.

In places where the description above refers to specific embodiments of wheelchair systems and related methods, one or more or many modifications may be made without departing from the spirit and scope thereof. Details of any specific embodiment/implementation described herein may, wherever possible, be applied to any other specific implementation/embodiment described herein.

What is claimed is:

1. A wheelchair system, comprising:
a chip assembly configured to be coupled with a wheelchair, the chip assembly comprising a wireless communication chip;
wherein the wireless communication chip is programmed to, in response to the chip assembly coming within a predetermined range of a dedicated short range communication (DSRC) device of an automobile, automatically communicate, through a telecommunications network, a notification signal to the DSRC device that the wheelchair is within the predetermined range;
wherein the chip assembly comprises one or more chips configured to, in response to receiving an acknowledgment signal through the telecommunications network from the DSRC device, provide an acknowledgment notification to a user of the wheelchair that the notification signal was received;
the wheelchair system further comprising a light communicatively coupled with the chip assembly, wherein the acknowledgment notification comprises illuminating the light.

2. A wheelchair system, comprising:
a chip assembly configured to be coupled with a wheelchair, the chip assembly comprising a wireless communication chip;
wherein the wireless communication chip is programmed to, in response to the chip assembly coming within a predetermined range of a dedicated short range communication (DSRC) device of an automobile, automatically communicate, through a telecommunications network, a notification signal to the DSRC device that the wheelchair is within the predetermined range;
wherein the chip assembly comprises one or more chips configured to, in response to receiving an acknowledgment signal through the telecommunications network from the DSRC device, provide an acknowledgment notification to a user of the wheelchair that the notification signal was received;
the wheelchair system further comprising a sound unit communicatively coupled with the chip assembly, wherein the acknowledgment notification comprises a sound generated by the sound unit.

3. A wheelchair system, comprising:
a chip assembly configured to be coupled with a wheelchair, the chip assembly comprising a wireless communication chip;
wherein the wireless communication chip is programmed to, in response to the chip assembly coming within a predetermined range of a dedicated short range communication (DSRC) device of an automobile, automatically communicate, through a telecommunications network, a notification signal to the DSRC device that the wheelchair is within the predetermined range;
wherein the chip assembly comprises one or more chips configured to, in response to receiving an acknowledgment signal through the telecommunications network from the DSRC device, provide an acknowledgment notification to a user of the wheelchair that the notification signal was received;
the wheelchair system further comprising a tactile unit communicatively coupled with the chip assembly, wherein the acknowledgment notification comprises a tactile notification generated by the tactile unit.

4. A wheelchair system, comprising:
a chip assembly configured to be coupled with a wheelchair, the chip assembly comprising a wireless communication chip;
wherein the wireless communication chip is programmed to, in response to the chip assembly coming within a predetermined range of a dedicated short range communication (DSRC) device of an automobile, automatically communicate, through a telecommunications network, a notification signal to the DSRC device that the wheelchair is within the predetermined range;
wherein the chip assembly comprises a memory having a geospatial algorithm stored therein, and wherein the chip assembly is programmed to determine, using the geospatial algorithm, when the wheelchair has experienced an accident event.

5. The wheelchair system of claim 4, wherein the chip assembly is programmed to, in response to determining that the wheelchair has experienced the accident event, automatically send an accident notification to a person whose contact information is stored within the database.

6. A wheelchair system, comprising:
a wheelchair;
a chip assembly coupled with the wheelchair, the chip assembly comprising a wireless communication chip, and;
a database communicatively coupled with the chip assembly through a telecommunications network;
wherein the wireless communication chip is programmed to, in response to the chip assembly coming within a predetermined range of a dedicated short range communication (DSRC) device of an automobile, automatically communicate, through the telecommunications network, a notification signal to the DSRC device that the wheelchair is within the predetermined range;

wherein the chip assembly comprises one or more chips configured to, in response to receiving an acknowledgment signal through the telecommunications network from the DSRC device, provide an acknowledgment notification to a user of the wheelchair, wherein the acknowledgment notification comprises one of a sound notification generated by a sound device coupled with the chip assembly, a tactile notification generated by a tactile unit coupled with the chip assembly, and a visual signal generated by a light coupled with the chip assembly.

7. A wheelchair system, comprising:

a wheelchair;

a chip assembly coupled with the wheelchair, the chip assembly comprising a wireless communication chip, and;

a database communicatively coupled with the chip assembly through a telecommunications network;

wherein the wireless communication chip is programmed to, in response to the chip assembly coming within a predetermined range of a dedicated short range communication (DSRC) device of an automobile, automatically communicate, through the telecommunications network, a notification signal to the DSRC device that the wheelchair is within the predetermined range;

wherein the chip assembly comprises a memory having a geospatial algorithm stored therein, wherein the chip assembly is programmed to determine, using the geospatial algorithm, when the wheelchair has experienced an accident event and to, in response to determining that the wheelchair has experienced the accident event, automatically send an accident notification to one of police, emergency personnel, and a contact person stored in the database.

8. A method of use of a wheelchair system, comprising:

providing a chip assembly configured to be coupled with a wheelchair, the chip assembly comprising a wireless communication chip;

providing a database communicatively coupled with the chip assembly through a telecommunications network;

in response to the chip assembly entering a predetermined range of a dedicated short range communication (DSRC) device of an automobile, automatically wirelessly communicating, through the telecommunications network, a notification signal from the wireless communication chip to the DSRC device that the wheelchair is within the predetermined range;

in response to the DSRC device receiving the notification signal, automatically wirelessly communicating an acknowledgment signal to the chip assembly from the DSRC device, and;

in response to the chip assembly receiving the acknowledgment signal, providing one of a sound notification, a tactile notification, and a visual notification to a user of the wheelchair.

9. A method of use of a wheelchair system, comprising:

providing a chip assembly configured to be coupled with a wheelchair, the chip assembly comprising a wireless communication chip;

providing a database communicatively coupled with the chip assembly through a telecommunications network, and;

in response to the chip assembly entering a predetermined range of a dedicated short range communication (DSRC) device of an automobile, automatically wirelessly communicating, through the telecommunications network, a notification signal from the wireless communication chip to the DSRC device that the wheelchair is within the predetermined range;

wherein the chip assembly comprises a memory having a geospatial algorithm stored therein, and wherein the method further comprises the chip assembly determining, using the geospatial algorithm, when the wheelchair has experienced an accident event and, in response to determining that the accident event has occurred, automatically sending an accident notification to a person whose contact information is stored within the database.

* * * * *

UNITED STATES PATENT AND TRADEMARK OFFICE
CERTIFICATE OF CORRECTION

PATENT NO. : 10,182,952 B1
APPLICATION NO. : 15/929032
DATED : January 22, 2019
INVENTOR(S) : Blanche Michelle Nelson-Herron and Gary B. Justice It is certified that error appears in the above-identified patent and that said Letters Patent is hereby corrected as shown below:

In the Specification

Column 1, Line 31, replace "wheelchair-pedestrian" with -wheelchair pedestrians-.

Column 3, Line 37, replace "is front" with -is a front-.

Column 3, Line 49, replace "is front" with -is a front-.

Column 6, Line 57, replace "a use" with -a user-.

Column 11, Line 29, replace "of if" with -or if-.

Signed and Sealed this
Twenty-sixth Day of February, 2019

Andrei Iancu
*Director of the United States Patent and Trademark Office*